United States Patent
Bates et al.

(10) Patent No.: US 8,994,307 B2
(45) Date of Patent: *Mar. 31, 2015

(54) SELECTIVELY LOWERING RESISTANCE OF A CONSTANTLY USED PORTION OF MOTOR WINDINGS IN AN ELECTRIC MOTOR

(71) Applicant: International Business Machines Corporation, Armonk, NY (US)

(72) Inventors: Allen K. Bates, Tucson, AZ (US); Nhan X. Bui, Tucson, AZ (US); Reed A. Hancock, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/782,452

(22) Filed: Mar. 1, 2013

(65) Prior Publication Data

US 2013/0229136 A1    Sep. 5, 2013

Related U.S. Application Data

(63) Continuation-in-part of application No. 13/614,925, filed on Sep. 13, 2012, which is a continuation-in-part of application No. 12/355,495, filed on Jan. 16, 2009, now Pat. No. 8,288,979.

(51) Int. Cl.
| | |
|---|---|
| *H02K 29/06* | (2006.01) |
| *H02P 25/18* | (2006.01) |
| *H02P 1/04* | (2006.01) |
| *H02P 3/12* | (2006.01) |

(52) U.S. Cl.
CPC ...... *H02P 25/18* (2013.01); *H02P 1/04* (2013.01); *H02P 3/12* (2013.01)
USPC ...... 318/432; 318/495; 318/400.41; 318/376; 318/400.09; 318/771; 310/198; 310/184; 310/179; 360/73.06; 360/73.01

(58) Field of Classification Search
USPC ........... 318/7, 400.09, 771, 495, 497, 496, 318/400.41, 376; 360/73.06, 73.01; 310/179, 184, 198
See application file for complete search history.

(56) References Cited

U.S. PATENT DOCUMENTS

| | | | | |
|---|---|---|---|---|
| 3,876,168 | A | * | 4/1975 | Powers, Jr. ........... 242/331.2 |
| 4,167,692 | A | | 9/1979 | Sekiya et al. |
| 4,801,853 | A | * | 1/1989 | Lewis et al. .............. 318/7 |
| 4,890,049 | A | | 12/1989 | Auinger |
| 5,068,587 | A | * | 11/1991 | Nakamura et al. ...... 318/771 |

(Continued)

FOREIGN PATENT DOCUMENTS

WO    WO2007089529 A2    9/2007

*Primary Examiner* — Kawing Chan
*Assistant Examiner* — Jorge L Carrasquillo
(74) *Attorney, Agent, or Firm* — Griffiths & Seaton PLLC

(57) ABSTRACT

Dynamic reconfiguration-switching of motor windings in a motor is optimized between winding-configurations by selectively lowering resistance of a constantly used portion of one of the motor windings. Acceleration is traded off in favor of higher velocity upon detecting the electric motor in the electric vehicle is at an optimal angular-velocity for switching to an optimal lower torque constant and voltage constant. The total back electromotive force (BEMF) is prohibited from inhibiting further acceleration to a higher angular-velocity.

63 Claims, 31 Drawing Sheets

(56) References Cited

U.S. PATENT DOCUMENTS

| | | |
|---|---|---|
| 5,306,972 A | 4/1994 | Hokanson et al. |
| 5,614,799 A * | 3/1997 | Anderson et al. ........ 318/400.09 |
| 5,912,522 A | 6/1999 | Rivera |
| 6,215,261 B1 | 4/2001 | Becerra |
| 6,727,668 B1 | 4/2004 | Maslov et al. |
| 7,102,307 B2 | 9/2006 | Shao |
| 2005/0052080 A1 | 3/2005 | Maslov et al. |
| 2006/0076171 A1 | 4/2006 | Donnelly et al. |
| 2008/0116759 A1 | 5/2008 | Lin |
| 2009/0160392 A1 | 6/2009 | Mularcik |
| 2009/0295315 A1 | 12/2009 | Tarnow et al. |
| 2010/0052584 A1 | 3/2010 | Bates et al. |
| 2010/0123426 A1 | 5/2010 | Nashiki et al. |
| 2011/0205662 A1 | 8/2011 | Bates et al. |
| 2011/0241592 A1 * | 10/2011 | Lin .............................. 318/497 |

* cited by examiner

Derivation of Optimal Switching Algorithm, for 3 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV − V = (X−1)V | XV | X*(X−1)*(V/A) |
| K/3 | A/3 | 3V − XV = (3−X)V | 3V | 3(3−X)(V/A) |

FIG. 7

Profile of Optimal Switching Algorithm (Figure 7 with X = 2)

| Voltage Constant and Torque Constant | Angular Acceleration | Delta Angular Velocity | Total Angular Velocity | Delta Time |
|---|---|---|---|---|
| K | A | V | V | (V/A) = T |
| K/2 | A/2 | V | XV = 2V | 2(V/A) = 2T |
| K/3 | A/3 | V | 3V | 3(V/A) = 3T (giving a total time is 6T to ramp up to an angular velocity of 3V) |

FIG. 8

Voltage Constant Used as a function of Winding-Configuration Number WC

| State "WC" | Voltage Constant = Torque Constant = K/WC | Angular Acceleration = A/WC | Time when State "WC" is in effect |
|---|---|---|---|
| 1 | K | A | 0 to T |
| 2 | K/2 | A/2 | T to 3T |
| 3 | K/3 | A/3 | 3T to 6T |

FIG. 9

Derivation of Optimal Switching Algorithm, for 5 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV - V = (X-1)V | XV | X*(X-1)*(V/A) |
| K/Y | A/Y | YV - XV = (Y-X)V | YV | Y*(Y-X)(V/A) |
| K/Z | A/Z | ZV - YV = (Z-Y)V | ZV | Z*(Z-Y)*(V/A) |
| K/3 | A/3 | 3V - ZV = (3-Z)V | 3V | 3*(3-Z)*(V/A) |

FIG. 11

Profile of Optimal Switching Algorithm (Figure 11 with X = 3/2, Y = 2, and Z = 5/2)

| Voltage Constant and Torque Constant | Angular Acceleration | Delta Angular Velocity | Total Angular Velocity | Delta Time |
|---|---|---|---|---|
| K | A | V | V | T where T = V/A |
| 2K/3 | 2A/3 | V/2 | 3V/2 | 3T/4 |
| K/2 | A/2 | V/2 | 2V | T |
| 2K/5 | 2A/5 | V/2 | 5V/2 | 5T/4 |
| K/3 | A/3 | V/2 | 3V | 3T/2 (giving a total time of 11T/2 to ramp up to an angular velocity of 3V) |

FIG. 12

Voltage Constant Used as a function of Winding-Configuration Number WC

| State "WC" | Voltage Constant and Torque Constant | Angular Acceleration | Maximum Angular Velocity | Time when State "WC" is in effect |
|---|---|---|---|---|
| 1 | K | A | V | 0 to T |
| 2 | 2K/3 | 2A/3 | 3V/2 | T to 7T/4 |
| 3 | K/2 | A/2 | 2V | 7T/4 to 11T/4 |
| 4 | 2K/5 | 2A/5 | 5V/2 | 11T/4 to 4T |
| 5 | K/3 | A/3 | 3V | 4T to 11T/2 |

FIG. 13

Derivation of Optimal Switching Algorithm, for 2 Winding Configurations, with N=3.

| State "WC" | Voltage Constant and Torque Constant | Angular Acceleration | Maximum Angular Velocity | Time when State "WC" is in effect |
|---|---|---|---|---|
| 1 | K | A | V | 0 to T |
| 2 | K/3 | A/3 | 3V | T to 7T |

FIG. 14

Derivation of Optimal Switching Algorithm, for 4 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV − V = (X−1)V | XV | X*(X−1)*(V/A) |
| K/Y | A/Y | YV − XV = (Y−X)V | YV | Y*(Y−X)*(V/A) |
| K/3 | A/3 | 3V − YV = (3−Y)V | 3V | 3*(3−Y)*(V/A) |

FIG. 15

Profile of Optimal Switching Algorithm (Figure 15 with X = 5/3, Y = 7/3)

| Voltage Constant and Torque Constant | Angular Acceleration | Delta Angular Velocity | Total Angular Velocity | Delta Time |
|---|---|---|---|---|
| K | A | V | V | T where T=V/A |
| 3K/5 | 3A/5 | 2V/3 | 5V/3 | 10T/9 |
| 3K/7 | 3A/7 | 2V/3 | 7V/3 | 14T/9 |
| K/3 | A/3 | 2V/3 | 3V | 2T (giving a total time of 51T/9 to ramp up to an angular velocity of 3V) |

FIG. 16

Four-Winding-Configuration motor

| State "WC" | Voltage Constant | Angular Acceleration | Maximum Angular Velocity | Time when State "WC" is in effect |
|---|---|---|---|---|
| 1 | K | A | V | 0 to T |
| 2 | 3K/5 | 3A/5 | 5V/3 | T to 19T/9 |
| 3 | 3K/7 | 3A/7 | 7V/3 | 19T/9 to 33T/9 |
| 4 | K/3 | A/3 | 3V | 33T/9 to 51T/9 |

Table of the total time to ramp up to an angular velocity of 3V versus the total number of available winding-configurations, where T= V/A

| Total Number of Winding-Configurations (WC) | Total Time to Ramp up to 3V | In Decimal Form |
|---|---|---|
| 1 | 9T | 9T |
| 2 | 7T | 7T |
| 3 | 6T | 6T |
| 4 | 51T/9 | 5.67T |
| 5 | 11T/2 | 5.5T |

FIG. 18

Derivation of 3-Winding-Configuration Optimal Switching Algorithm for NV final speed

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV − V = (X−1)V | XV | X*(X−1)*(V/A) |
| K/N | A/N | NV − XV = (N−X)V | NV | N(N−X)(V/A) |

FIG. 20

Derivation of the (m+2)-Winding-Configuration Optimal Switching Algorithm for a final velocity of NV (where V is the maximum angular velocity for the full voltage and torque constant K).

| Voltage Constant and Torque Constant | Angular Acceleration | Delta Angular Velocity | Total Angular Velocity | Delta Time |
|---|---|---|---|---|
| K | A | V | V | V/A |
| $K/X_1$ | $A/X_1$ | $X_1V - V = (X_1-1)V$ | $X_1V$ | $X_1*(X_1-1)*(V/A)$ |
| $K/X_2$ | $A/X_2$ | $X_2V - X_1V = (X_2-X_1)V$ | $X_2V$ | $X_2*(X_2-X_1)*(V/A)$ |
| $K/X_3$ | $A/X_3$ | $X_3V - X_2V = (X_3-X_2)V$ | $X_3V$ | $X_3*(X_3-X_2)*(V/A)$ |
| $K/X_m$ | $A/X_m$ | $X_mV - X_{m-1}V = (X_m-X_{m-1})V$ | $X_{m-1}V$ | $X_m*(X_m-X_{m-1})*(V/A)$ |
| K/N | A/N | $NV - X_mV = (N-X_m)V$ | NV | $N*(N-X_m)*(V/A)$ |

FIG. 21

Profile of Optimal Switching Algorithm: Figure 20 with X = (N+1)/2

| Voltage Constant and Torque Constant | Angular Acceleration | Delta Angular Velocity | Total Angular Velocity | Delta Time |
|---|---|---|---|---|
| K | A | V | V | T |
| 2K/(N+1) | 2A/(N+1) | (N-1)V/2 | (N+1)V/2 | $(N^2-1)T/4$ |
| K/N | A/N | (N-1)V/2 | NV | $(N^2-N)T/2$ |

FIG. 23

Brushless DC Motor/Electric Motor – 3 Phases

3000 Profile of Optimal Switching Algorithm (See Figure 7 with X = 2)

| Winding Configuration "WC" | Required Voltage Constant and Torque Constant | K/2 Segment | K/3 Segment | K/6 Segment | Delta Time |
|---|---|---|---|---|---|
| 1 | K | K/2 | K/3 | K/6 | 0 to T |
| 2 | K/2 | Not Used | K/3 | K/6 | T to 3T |
| 3 | K/3 | Not Used | K/3 Always Used | Not Used | 3T to 6T for ramp up, and the continuing during steady state mode. |

| Winding Configuration "WC" | Optimal Torque Constant | Segment 1 | Segment 2 | Segment 3 | Highest Angular Velocity |
|---|---|---|---|---|---|
| 1 | K | K/N | $(N-1)K/[N(N+1)]$ | $(N-1)K/(N+1)$ | V |
| 2 | $2K/(N+1)$ | K/N | $(N-1)K/[N(N+1)]$ | Not Used | $(N+1)V/2$ |
| 3 | K/N | K/N Always Used | Not Used | Not Used | NV |

FIG. 30B

3100 Optimal winding configuration for a 4-winding configuration motor spinning up to an angular velocity NV=3V radians per second (N=3)

| Winding Configuration "WC" | Optimal Torque Constant | Segment 1 | Segment 2 | Segment 3 | Segment 4 | Highest Angular Velocity | Delta Time |
|---|---|---|---|---|---|---|---|
| 1 | K | K/3 | 2K/21 | 6K/35 | 14K/35 | V | 0 to T |
| 2 | 3K/5 | K/3 | 2K/21 | 6K/35 | Not Used | 5V/3 | T to 19T/9 |
| 3 | 3K/7 | K/3 | 2K/21 | Not Used | Not Used | 7V/3 | 19T/9 to 33T/9 |
| 4 | K/3 | K/3 Always Used | Not Used | Not Used | Not Used | 3V | 33T/9 to 51T/9 |

| MATERIAL | RESISTIVITY IN NANO-OHM-METERS |
|---|---|
| SODIUM | 47.7 |
| LITHIUM | 92.8 |
| CALCIUM | 33.6 |
| POTASSIUM | 72 |
| BERYLLIUM | 35.6 |
| ALUMINUM | 26.5 |
| MAGNESIUM | 43.9 |
| COPPER | 16.78 |
| SILVER | 15.87 |
| GOLD | 22.14 |
| IRON | 96.1 |

FIG. 32

SELECTIVELY LOWERING RESISTANCE OF A CONSTANTLY USED PORTION OF MOTOR WINDINGS IN AN ELECTRIC MOTOR

CROSS-REFERENCE TO RELATED APPLICATION

This application is a continuation in part application of U.S. application Ser. No. 13/614,925, filed Sep. 13, 2012, now U.S. Published Application US 2013/0002184-A1, which is a continuation in part application of U.S. application Ser. No. 12/355,495, filed Jan. 16, 2009, now U.S. Pat. No. 8,288,979, the entire contents of which are incorporated herein by reference and is relied upon for claiming the benefit of priority.

BACKGROUND OF THE INVENTION

1. Field of the Invention

The present invention generally relates to field of electronic systems. The present invention specifically relates to optimizing dynamic reconfiguration-switching of motor windings between one of a multiplicity of winding-configurations by selectively lowering resistance of a constantly used portion of an electric motor.

2. Description of the Related Art

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another means of propulsion, to drive the wheels.

As the power demands on the electrical systems in alternative fuel vehicles continue to increase, there is an ever increasing need to maximize the electrical, as well as the mechanical, efficiency of such systems. Additionally, there is a constant desire to reduce the number components required to operate alternative fuel vehicles and minimize the overall cost and weight of the vehicles.

SUMMARY OF THE INVENTION

Alternative fuel vehicles frequently employ electric motors and feedback control systems with motor drivers for vehicle propulsion, particularly in hybrid settings. While the motors rotate, a back electromotive force ("BEMF") is produced by the electric motors. This BEMF voltage is produced because the electric motors generate an opposing voltage while rotating.

While electric motors in hybrid systems provide some energy savings, inefficiencies remain. For example, most vehicles continue to utilize a transmission mechanism to transfer power from a vehicle engine, be it gas or electric, to drive the wheels. In place of a conventional vehicle transmission system, a wheel motor system may be implemented where the electric motors are placed near, or essentially within, the wheels they are intended to drive. Using such systems, it may be possible to reduce, perhaps even eliminate, the need for any sort of transmission or driveline that couples the electric motor to the wheel.

Thus, a wheel motor has the potential to both increase mechanical efficiency and reduce the number of components. Such a wheel motor necessarily requires a control mechanism to substitute for the functionality provided by a conventional transmission, such as gear and braking functionality. Accordingly, a need exists for an apparatus, system, and method for control of a wheel motor to provide such functionality. Furthermore, other desirable features and characteristics of the present invention will become apparent from the subsequent detailed description and the appended claims, taken in conjunction with the accompanying drawings and the foregoing technical field and background.

Accordingly, and in view of the foregoing, various exemplary method, system, and computer program product embodiments for dynamic reconfiguration-switching of motor windings of a motor. In one embodiment, by way of example only, dynamic reconfiguration-switching of motor windings in a motor is optimized between winding-configurations by selectively lowering resistance of a constantly used portion of one of the motor windings. Acceleration is traded off in favor of higher velocity upon detecting the electric motor in the electric vehicle is at an optimal angular-velocity for switching to an optimal lower torque constant and voltage constant. The total back electromotive force (BEMF) is prohibited from inhibiting further acceleration to a higher angular-velocity.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a table diagram illustrating an exemplary derivation of the optimal switching calculation for optimizing a dynamic reconfiguration-switching between individual motor windings and dynamically switching between a 3-winding-configuration motor for trading off angular-acceleration in favor of increased angular-velocity between each successive winding-configuration, with N=3;

FIG. 8 is a table diagram illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration;

FIG. 9 is a table diagram illustrating an exemplary operation for optimizing the dynamic reconfiguration-switching using a voltage constant as a function of the winding-configuration number "WC" using 3 winding-configurations;

FIG. 11 is a table diagram illustrating an exemplary derivation of the optimal switching calculation for optimizing a dynamic reconfiguration-switching between individual motor windings and dynamically switching between a 5-winding-configuration motor for trading off angular-acceleration in favor of increased angular-velocity between each successive winding-configuration, with N=3;

FIG. 12 is a table diagram illustrating an exemplary profile of the optimal switching calculation for optimizing a dynamic reconfiguration-switching between individual motor windings in a 5-winding-configuration motor for trading off angular-acceleration in favor of increased angular-velocity between each successive winding-configuration;

FIG. 13 is a table diagram illustrating an exemplary operation for optimizing the dynamic reconfiguration-switching using a voltage constant as a function of the winding-configuration number "WC" using 5 winding-configurations;

FIG. 14 is a table diagram illustrating an exemplary operation for optimizing the dynamic reconfiguration-switching using a voltage constant as a function of the winding-configuration number "WC" using 2 winding-configurations, with N=3;

FIG. 15 is a table diagram illustrating an exemplary derivation of the optimal switching calculation for optimizing a dynamic reconfiguration-switching between individual motor windings and dynamically switching between a 4-winding-configuration motor for trading off angular-acceleration in favor of increased angular-velocity between each successive winding-configuration, with N=3;

FIG. 16 is a table diagram illustrating an exemplary profile of the optimal switching calculation for optimizing a dynamic reconfiguration-switching between individual motor windings in a 4-winding-configuration motor for trading off angular-acceleration in favor of increased angular-velocity between each successive winding-configuration;

FIG. 17 is an additional table diagram illustrating an exemplary operation for optimizing the dynamic reconfiguration-switching using a voltage constant as a function of the winding-configuration number "WC" using 4 winding-configurations;

FIG. 18 is a table diagram summarizing FIGS. 7-17 in terms of the total time to ramp up to an angular velocity of 3V versus the total number of available winding-configurations, where T=V/A;

FIG. 20 is a table diagram illustrating an exemplary derivation of a 3-winding-configuration optimal switching algorithm for a final speed of NV, where V is the maximum angular-velocity for the full voltage and torque constant K, and N is an arbitrary multiplicative factor;

FIG. 21 is a table diagram illustrating an exemplary derivation of a (m+2)-winding-configuration optimal switching algorithm for a final velocity of NV, where V is the maximum angular-velocity for the full voltage and torque constant K, and N is an arbitrary multiplicative factor;

FIG. 23 is a table diagram illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration where X=(N+1)/2;

FIG. 30A is a table diagram illustrating an exemplary profile of the optimal switching calculation for optimizing a dynamic reconfiguration-switching between individual motor windings by selectively lowering resistance of a constantly used portion of a 3-winding-configuration motor for trading off angular-acceleration in favor of increased angular-velocity between each successive winding-configuration;

FIG. 30B is a table diagram illustrating an exemplary profile of an optimal winding configuration for a 3-winding-configuration motor spinning up to an angular velocity NV radians per second (N is a variable greater than unity);

FIG. 31 is a table diagram illustrating an exemplary profile of the optimal winding configuration for a 4-winding-configuration motor spinning up to an angular velocity NV=3V radians per second (N=3);

FIG. 32 is a table diagram illustrating an exemplary resistivity of various types of materials;

DETAILED DESCRIPTION OF THE DRAWINGS

The illustrated embodiments below provide mechanisms for wheel motor control in a vehicle. The mechanisms function to increase maximum vehicle wheel angular velocity by use of a motor control switching circuit. The motor control switching circuit reduces the total Back EMF (BEMF) produced by the wheel motor by placing the motor coils in a parallel configuration. When maximum velocity is needed, a portion of the motor coils is bypassed. Although bypassing a portion of the motor coils reduces the rotational acceleration capability of the motor because the torque constant of the motor is reduced in the effort to reduce the voltage constant of the motor, the motor control switching circuit is able to produce the necessary acceleration when needed by switching in the previously bypassed motor coils.

The mechanisms of the illustrated embodiments further function to maximize vehicle wheel torque (such as during vehicle acceleration and deceleration modes of operation) by the use of the motor control switching circuit, by selectively activating switches to place the motor coils in a serial coil configuration. Finally, the mechanisms provide dynamic braking functionality by shorting the motor coils as will be further described.

Use of the illustrated embodiments in a wheel motor setting may obviate the need for a conventional vehicle transmission system, saving weight and reducing energy consumption while increasing efficiency. As previously described, such embodiments may substitute for conventional transmission functionality by providing integrated gear and braking functionality.

Figure 1:
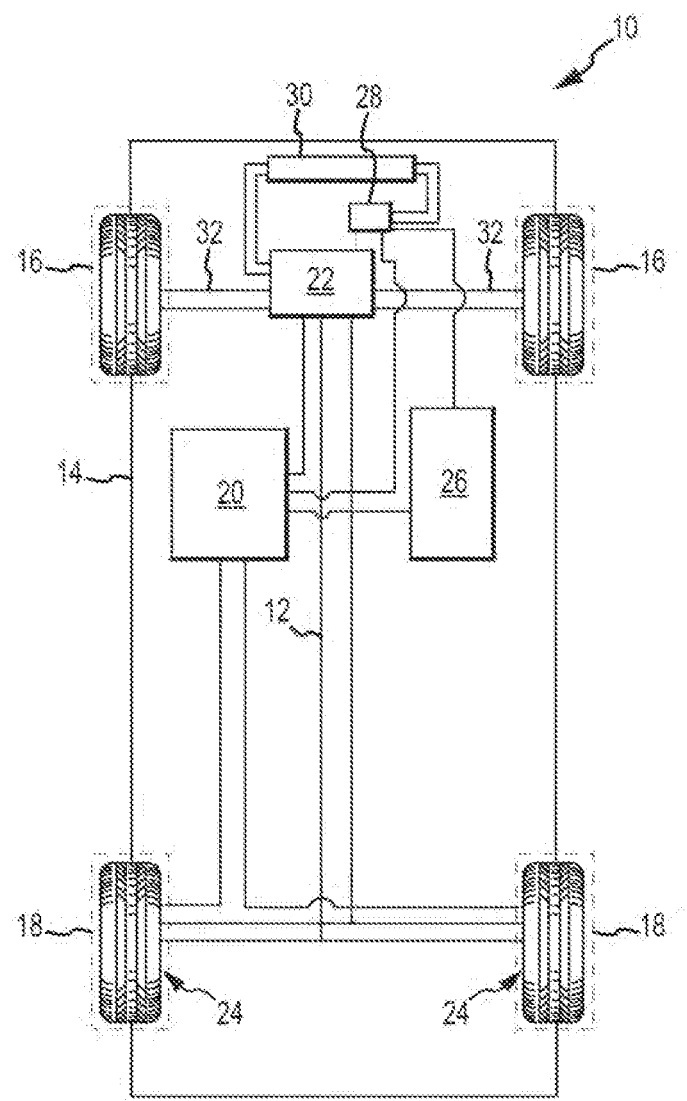
FIG. 1 is a diagram illustrating an exemplary hybrid vehicle.

In the exemplary embodiment illustrated in FIG. 1, motor vehicle 10 is a hybrid vehicle, and further includes an internal combustion engine 22, wheel motors (or wheel assemblies) 24, a battery/capacitor(s) 26, a power inverter (or inverter) 28, and a radiator 30. The internal combustion engine 22 is mechanically coupled to the front wheels 16 through drive shafts 32 through a transmission (not shown). Each of the wheel motors 24 is housed within one of the rear wheel assemblies 18. The battery 26 is coupled to an electronic control system 20 and the inverter 28. The radiator 30 is connected to the frame at an outer portion thereof and although not illustrated in detail, includes multiple cooling channels thereof that contain a cooling fluid (i.e., coolant) such as water and/or ethylene glycol (i.e., "antifreeze") and is coupled to the engine 22 and the inverter 28. Although not illustrated, the power inverter 28 may include a plurality of switches, or transistors, as is commonly understood. Battery 26 may be replaced (or augmented) with one or more capacitors 26 to store electrical charge.

The electronic control system 20 is in operable communication with the engine 22, the wheel motors 24, the battery 26, and the inverter 28. Although not shown in detail, the electronic control system 20 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. The type of vehicle 10 shown in FIG. 1 is for illustrative purposes only and the invention may be employed with other types of vehicles (for example, an electric-only vehicle).

As the skilled artisan will appreciate, the angular velocity of wheels 18 (and therefore wheel motors 24) varies as the vehicle 10 moves. For example, as the vehicle is starting from a stopped position, the angular velocity of wheels 16, 18 is lower than when the vehicle is cruising at a fixed rate of speed. The higher the angular velocity, the higher corresponding BEMF is produced in the wheel motors. BEMF may be defined as the angular velocity W of the wheel motor multiplied by the voltage constant Kvoltage of the wheel motor, which is equal to the torque constant Ktorque of the wheel motor when SI (metric) units are employed. It is the enclosed invention which reduces these two constants by using selective switching to bypass motor coils, in order to reduce the BEMF:

$$BEMF = K\text{voltage} * W \qquad (1).$$

The rotational acceleration capability of the wheel motor is reduced per equation (2), following, when selectively bypassing motor coils because the torque constant Ktorque of the wheel motor is reduced at the same time that the voltage constant Kvoltage is reduced. Reduction of the torque constant Ktorque reduces the torque provided (assuming the current remains the same) by the wheel motor, and that torque divided by the rotational inertia of the motor and wheel gives the rotational acceleration of the wheel motor and corresponding wheel per equation (3), following. However, these bypassed coils may be selectively re-engaged when that higher acceleration (or deacceleration) is desired, preferably when the angular velocity of the motor is in the range which permits an increase in back EMF (BEMF).

$$\text{Torque} = K\text{torque} * \text{Motor Current} \qquad (2).$$

$$\text{Rotational Acceleration} = \text{Torque}/(\text{Rotational Inertia of Motor} + \text{Vehicle Inertia}) \qquad (4).$$

Figure 2:
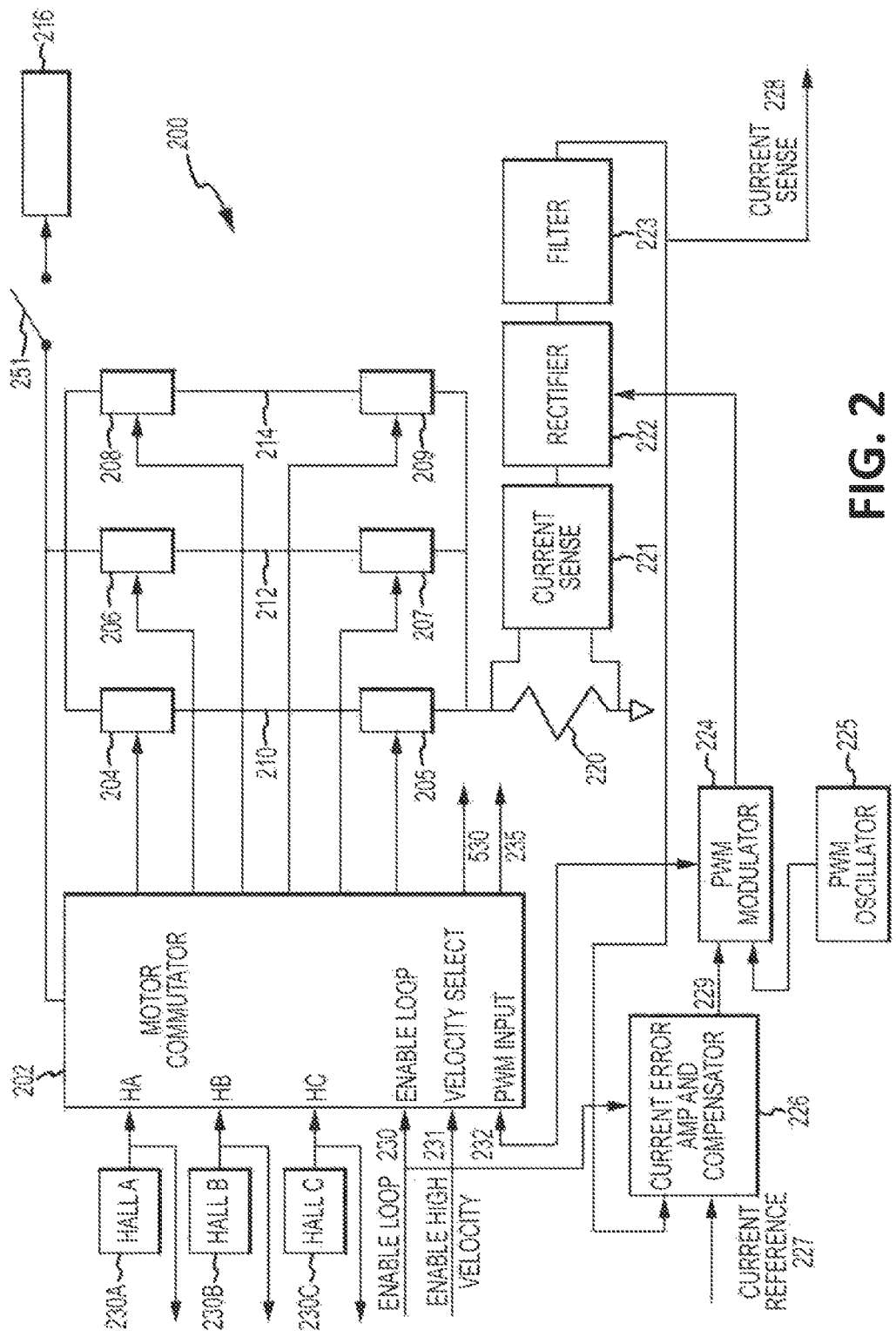
FIG. 2 is a block diagram of a motor control or driver circuit for a wheel motor.

FIG. 2 is a block diagram of a motor control or driver circuit 200 for brushless DC wheel motors for operation of the disclosed invention. A commutator 202 provides gate control for a set of power switches, such as FET switches 204, 205, 206, 207, 208 and 209, which, in turn, connect/disconnect the motor windings 210, 212 and 214 to/from a motor power supply 216 using switch 251. Sense resistor 220, current sense 221, rectifier 222 and filter 223 provide current sense signal 228 to current error amp and compensator 226.

Figure 4:
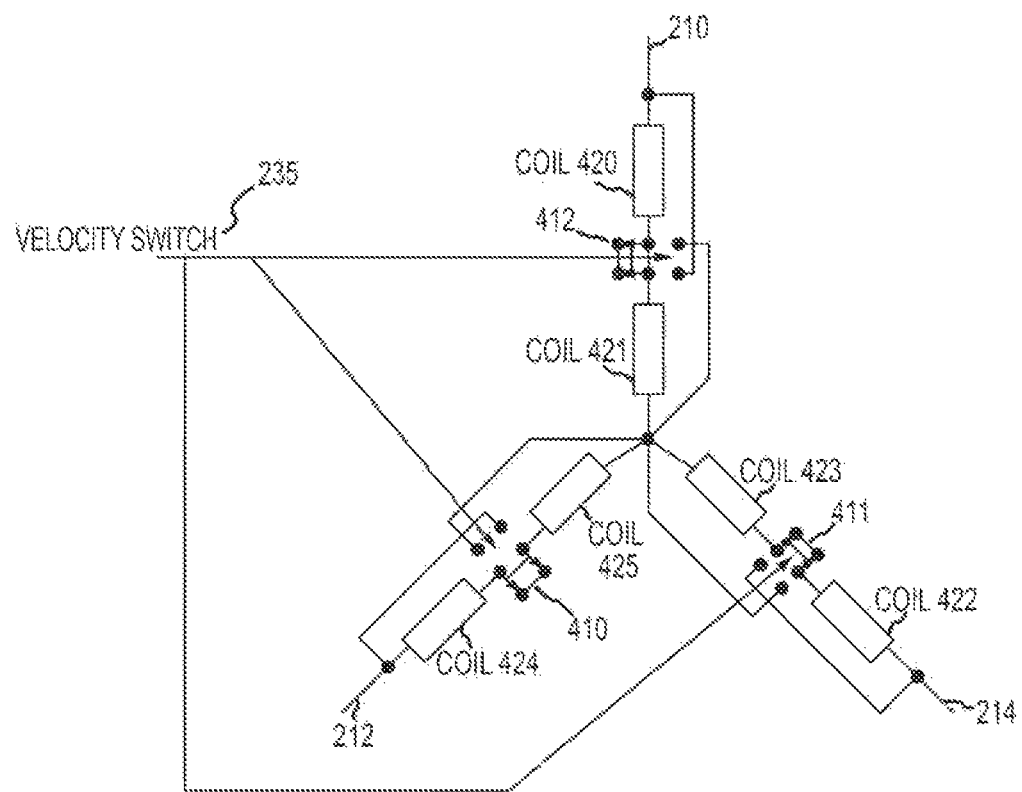
FIG. 4 is a first embodiment of motor coils with velocity switches.
Figure 5:
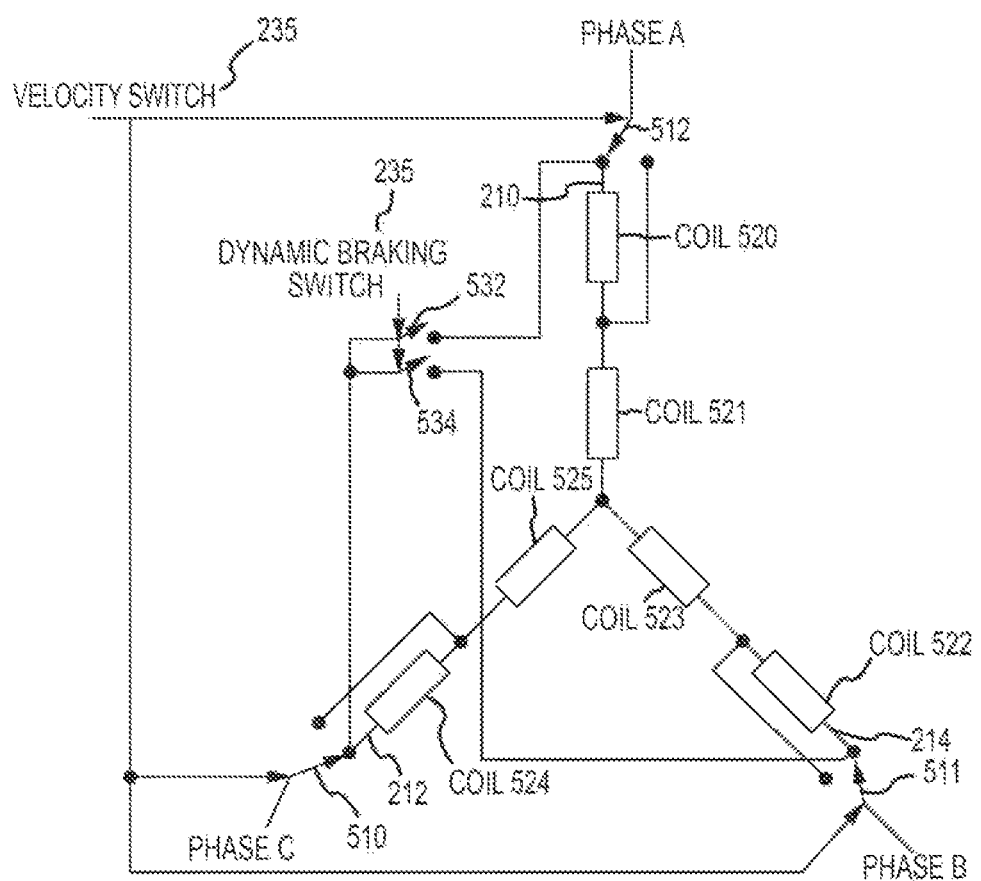
FIG. 5 is a second embodiment of motor coils with velocity switches and dynamic braking switches.

Current error amp and compensator 226 compares current sense signal 228 to current reference 227 and provides an error signal 229 to Pulse Width Modulation (PWM) modulator 224. Current error amp and compensator 226 also provides servo loop compensation to ensure a stable feedback loop for PWM modulator 224. Commutator 202 accepts hall sensor inputs HA, HB, HC from hall sensors 203A, 203B, and 203C, respectively. Commutator 202 also accepts enable loop 230, Enable high velocity 231 which provides Velocity select input, PWM input 232 to control the wheel motors 306 and 308 (FIG. 3) using FET switches 204, 205, 206, 207, 208 and 209. Velocity switch output 235 controls velocity switches 410, 411, 412, and 510, 511, and 512 (FIGS. 4, 5). Dynamic brake switch output 240 controls dynamic braking switches 532 and 534 (FIG. 5). PWM oscillator 225 also provides input to PWM 224.

Figure 3:
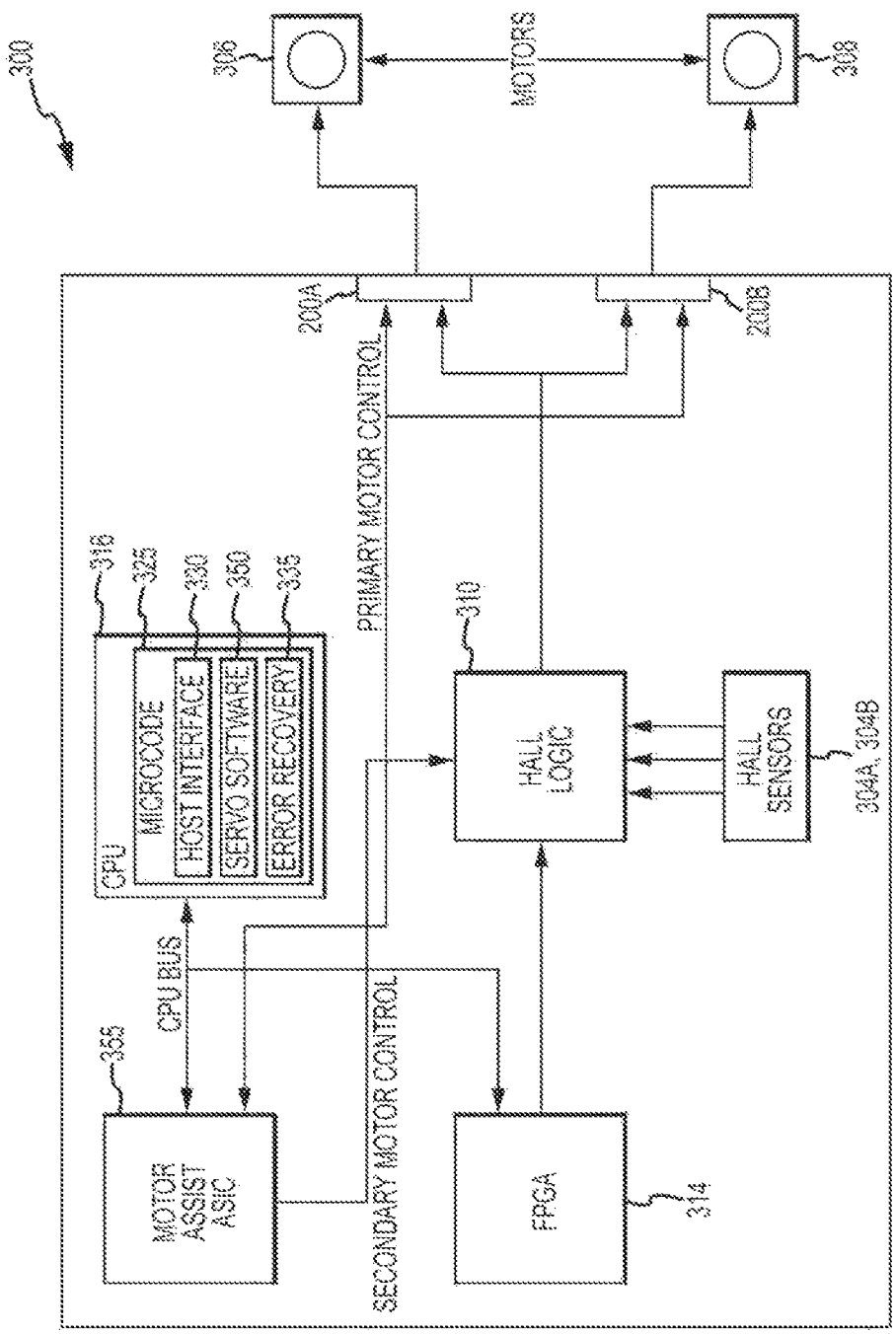
FIG. 3 is a portion of control circuit.

FIG. 3 is an exemplary block diagram of a portion 300 of the electronic control system 20 (FIG. 1) in which the velocity switch system of the present invention may be incorporated. Motor driver circuits 200A and 200B are coupled to the two wheel motors 306 and 308, respectively. Wheel motors 306 and 308, drive wheels 18 (FIG. 1). Hall sensors 304A and 304B are coupled to the two wheel motors 306 and 308, respectively.

The output from hall sensors 304A and 304B are coupled to hall sensor detection logic 310. During normal servo operation hall sensor detection logic 310 decodes the output signals from hall sensors 304A and 304B to provide motor rotation information for servo software 350. Hall sensor detection logic 310 may be implemented for example by software, firmware, hardware circuits (such as a field programmable gate array (FPGA) 314 as shown), a CPU, ASIC, etc., or a combination thereof. Servo software 350 processes the output from hall sensor detection logic 310 using control system laws to produce primary motor control signals that are transferred through motor assist ASIC (Application Specific Integrated Circuit) 355 and delivered to motor driver circuits 200A and 200B. Motor assist ASIC 355 provides current control logic.

Servo software 350 operates within the microcode section 325 of CPU 316. Other software components, including, host interface 330 and error recovery 335 also operate within the microcode section 325 of CPU 316. Host interface 330 provides communication between external hosts and CPU 316. Error recovery 335 provides software procedures to enable CPU 316 to direct operations to recover from errors that may occur during operation of the wheel motor. In addition, a wireless communication device 375, such as cell phone telepathy, Bluetooth or GPS-location, may be is used to input changes of N and m (as described below with particular reference to FIG. 25) into a servo system employing method 2500.

FIG. 4 shows a first embodiment of velocity control switches 410-412 with motor coils 420-425. Switches 410, 411, and 412 are shown in a position to enable serial connection of motor coils 420-425. During acceleration or deceleration of the wheel motor, Velocity switch output 235 activates and controls velocity switches 410, 411, and 412 in a position to enable serial connection of motor coils 420-425. This provides the maximum torque from wheel motors 306 and 308.

During periods of higher angular velocity, Velocity switch output 235 controls velocity switches 410, 411, and 412 in a position to enable parallel connection of motor coils 420-425. This provides the minimum BEMF to allow the maximum velocity from wheel motors 306 and 308.

FIG. 5 shows a second embodiment of velocity control switches 510-512 with motor coils 520-525. Switches 510, 511, and 512 are shown in a position to enable serial connection of motor coils 520-525. During acceleration or deceleration, velocity switch output 235 controls velocity switches 510, 511, and 512 in a position to enable serial connection of motor coils 520-525. This provides the maximum torque from wheel motors 306 and 308.

During periods of higher velocity, velocity switch output 235 controls velocity switches 510, 511, and 512 in a position to enable bypass of motor coils 520, 522, and 524 (coils 520, 522, and 524 are left open). This provides the minimum BEMF to allow the maximum angular velocity from wheel motors 306 and 308.

The motor coils in FIG. 5 may function as a generator during a deceleration of the vehicle, acting to charge the battery/capacitor(s) 26. In this way, the wheels 18 (FIG. 1) are driving the wheel motors 24, instead of the wheel motors 24 driving the wheels. During such an operation current reference 227 (FIG. 2) is set to zero.

Dynamic braking switch output 530 controls dynamic braking switches 532 and 534. During a braking period (in which the vehicle needs to be stopped quickly), dynamic braking switches are enabled (closed) to short the motor coils 520, 521, 522, 523, 524, and 525, forcing the generator voltage to zero volts. In this way, the wheel motors mechanically assist in braking the vehicle as the skilled artisan will appreciate.

Figure 6:
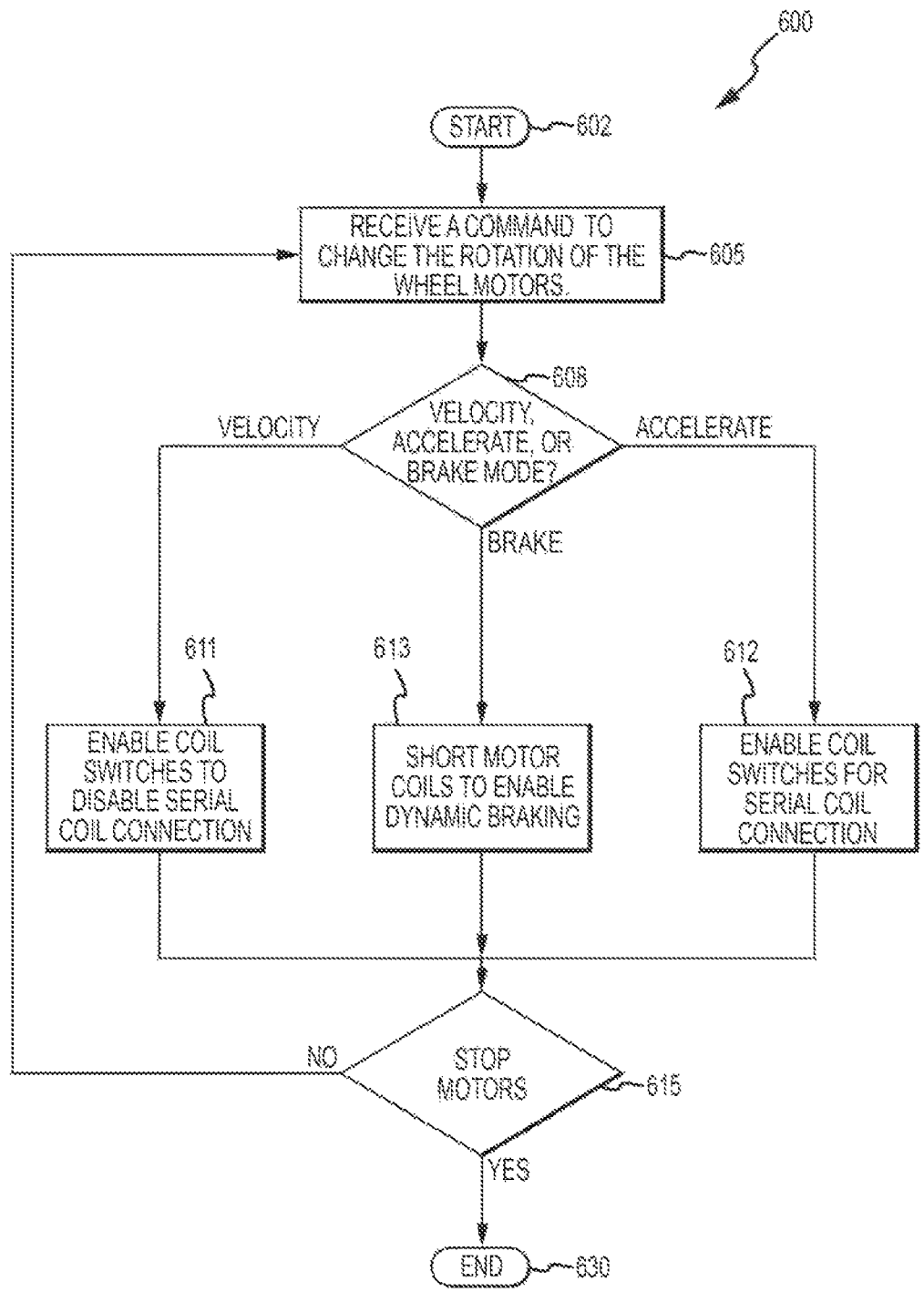
FIG. 6 is an exemplary flowchart for operation.

Turning to FIG. 6, an exemplary method of operation incorporating the mechanisms of the present invention is depicted. As one skilled in the art will appreciate, various steps in the method may be implemented in differing ways to suit a particular application. In addition, the described method may be implemented by various means, such as hardware, software, firmware, or a combination thereof. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 6 shows an exemplary flowchart 600 for operation. At step 605, control circuit 200 receives a command change the rotation of wheel motors 306 and 308 (FIG. 3). If at step 608, the vehicle requires an accelerate mode of operation (increased torque), then step 612 is executed to enable velocity control switches 510-512 for serial coil connection. If at step 608, the wheel motor requires a velocity mode of operation (less torque and higher angular velocity), then step 611 is executed to disable velocity control switches 510-512 for serial coil connection. If at step 608, the wheel motor requires a braking mode of operation (dynamic braking), then step 613 is executed to short the motor coils as previously described.

Control flows from step 611, 612, or 613 to step 615. At step 615, wheel motors 306 and 308 are stopped, then control flows to step 630 to end, otherwise control flows to step 610, to receive another command.

In light of the foregoing, an exemplary operation of a vehicle may proceed as follows. The vehicle may first be at a stopped position, and a request may be received to accelerate in a startup mode of operation. Since a larger torque is useful in this situation, the velocity control switches are activated for serial coil connection, giving the vehicle higher torque with all coils (520-525) engaged at startup.

Continuing the example above further, as the vehicle slows down, the previously selectively disengaged are re-engaged (again 520, 522, and 524), so that the vehicle may either speed up with additional torque or, if the vehicle is in a non-dynamic braking mode of operation, more energy may be generated by the wheel motor (now acting as a generator) to recharge the vehicle's battery. If the vehicle needs to be stopped quickly, dynamic braking may be engaged by shorting the motor coils, again as previously indicated. In certain embodiments, more than two motor coils per phase may be used to provide multiple maximum velocities for a given motor and power supplies.

The mechanisms of the present invention may be adapted for a variety of vehicle systems including a variety of electronic control systems for wheel motors, as one skilled in the art will anticipate. While one or more embodiments of the present invention have been illustrated in detail, the skilled artisan will appreciate that modifications and adaptations to those embodiments may be made without departing from the scope of the present invention as set forth in the following claims.

Moreover, the illustrated embodiments provide for optimal dynamic-reconfiguration-switching of coils within an electric motor of either a Y or Delta connection. More specifically, optimizing the dynamic reconfiguration-switching between individual motor windings occurs between multiple winding-configurations for increasing angular-velocity upon detecting the electric motor is at an optimal angular-velocity for an inductance switch, thereby preventing a total back electromotive force (BEMF) from inhibiting further increase in angular-velocity. The dynamic reconfiguration-switching of motor windings occurs between each of the winding-configurations at a minimal, optimal time for allowing a dynamic trade-off between the angular-velocity and angular-acceleration. In other words, the dynamic reconfiguration-switching of motor windings is optimized between winding-configurations for trading off angular-acceleration in favor of higher angular-velocity upon detecting an electric motor is at an optimal angular-velocity for switching to an optimal lower torque constant and voltage constant (the two being equal in SI units), thereby preventing a total back electromotive force (BEMF) from inhibiting further acceleration to a higher angular-velocity.

As illustrated below, as used in the SI (System International, commonly known as "metric") units, the Voltage Constant (Kv) equals the Torque Constant (Kt). The symbol "K" is used to denote either the Voltage Constant (Kv) or Torque Constant (Kt) when all of the motor windings are in use, since Kv and Kt are both equal when measured in SI (System International or "metric" units). For example, the equation K=Kv=Kt illustrates K is equal to the voltage constant "Kv" and the also equal to the torque constant "Kt". "K" is used for simplicity. Also, as will be described below, a list of Parameters used are described as:

K=voltage constant Kv=torque constant Kt (Kv=Kt for SI units),
V=Maximum Angular-velocity of Motor under full voltage constant K, in radians per second,
A=Angular-acceleration of Motor under full voltage constant K, in radians per second
T=V/A=units of time in seconds, for V and A defined above
m=number of equations=number of unknowns in the analysis,
j=index, $1 \le j \le m$,
$X_j$=x(j)=unknown, $1 \le j \le m$,
N=Multiplicative factor that V is multiplied by, N>1,
[A]=symmetric, tridiagonal coefficient matrix, size m-by-m,
{X}=vector of unknowns $X_j$, length of m,
{b}=right hand side vector={1 0 0 . . . 0 N}$^T$,
$F_j$=F(i)=factor used in the solution of [A] {X}={b},
$G_j$=G(i)=factor used in the solution of [A] {X}={b},
{KF}=vector of fractional voltage and torque constants={K, K/$X_j$, K/N}$^T$,
{Max_V}=vector of angular velocities for switching={V, $X_j$V, NV}$^T$,
WC=Number of possible winding-configurations in the motor=m+2, and "m" denotes the number of simultaneous linear equations and number of unknowns. It should be noted that throughout the specification the term "winding-configuration" may also be referred to as state, switch-state, configuration-state, switch-configuration-state, and winding-configuration-state. In all tables of the description, the initial voltage and torque constant will always be the maximum K because all of the voltage and torque constant are to be used. Similarly, the final value of voltage and torque constant is always K divided N (e.g., K/N). Thus, there are m+2 winding-configurations in a motor analyzed by m simultaneous linear equation and m unknowns, and the other two winding-configurations (initial and final) are known; however, it is not known at what angular-velocity to optimally transition between the m+2 winding-configurations and vector {Max_V}, and the present invention solves that optimal-control challenge.

Turning now to FIG. 7, a table diagram 700 illustrating an exemplary derivation of the optimal switching calculation is depicted for optimizing a dynamic reconfiguration-switching between individual motor windings and dynamically switching between a 3-winding-configuration motor for trading off angular-acceleration in favor of increased angular-velocity between each successive winding-configuration, with N=3. The table gives the construction of a switching algorithm, assuming that the final angular-velocity is 3V, where V represents an undetermined number of radians per second of angular rotation and N=3 is used to give numerical answers to the calculations. The voltage constant and torque constant show that K, K/X, and K/3 represent the three winding-configurations progressing from winding-configuration-1 where all of the motor windings are in full use, to winding-configuration-2, and finally to winding-configuration-3 in successive order. In other words, the voltage constant and torque constant show a maximal value of K, and then decrease in value to K/X, and finally to K/3 for the three winding-configurations progressing from initial winding-configuration-1 where all motor windings are used, to winding-configuration-2, and finally to winding-configuration-3 in successive order. The angular-acceleration starts at a maximal value of A, then decreases in value to A/X, and finally to A/3 for the three winding-configurations progressing from winding-configuration-1, winding-configuration-2 and winding-configuration-3 in successive order. The delta angular-velocity is V, XV−V=(X−1)V, and 3V−XV=(3−X)V for the three winding-configurations progressing from winding-configuration-1, winding-configuration-2 and winding-configuration-3 in successive order. The maximal angular-velocity increases from V, XV and 3V for the three winding-configurations progressing from winding-configuration-1, winding-configuration-2 and winding-configuration-3 in successive order. The delta time is (V/A), X*(X−1)*(V/A), and 3*(3−X)*(V/A) for the three winding-configurations progressing from winding-configuration-1, winding-configuration-2, winding-configuration-3.

By adding up the right-most column (labeled as "Delta Time") in FIG. 7, the total time to accelerate via the switching algorithm is expressed by the following single, algebraic, and quadratic equation in unknown X:

$$\text{Total\_time} = \left(\frac{V}{A}\right) * [1 + X * (X - 1) + 3(3 - X)], \quad (5)$$

where X is unknown coefficient and is unitless, and the algebraic expression has the units of time from the quotient V/A, where V/A is a delta time, V is angular-velocity and A is angular-acceleration when all motor windings are engaged, 3V is the final angular-velocity in radians per second (used only as an example representing N=3) and X is the unknown value.

By differentiating the total time (equation 5) with respect to X, to find the optimal value of X, and setting that derivative to zero, the following linear algebraic equation in unknown X is attained:

$$d\left[\left(\frac{V}{A}\right) * \frac{[1 + X * (X - 1) + 3(3 - X)]}{dx}\right] = \left(\frac{V}{A}\right) * [2X - 1 - 3] = 0, \quad (6)$$

whereby solving for X yields the unknown value of X, and it is determined that X equals 2 (e.g., X=2). By taking a second derivative of the total time with respect to unknown X in equation 5, the second derivative is derived to be 2V/A, which is a positive constant:

$$\frac{2V}{A} > 0. \quad (7).$$

This positive-second derivative indicates the optimal time for performing the dynamic reconfiguration-switching between individual motor windings in order to minimize the total time to ramp up to the angular velocity 3V. Because the second derivative is positive, it means that the algorithm has found the value of K/X equals (a) K/2 to switch to, (b) the time and angular-velocity to switch from K to K/2, and (c) the time and angular-velocity to switch from K/2 to K/3 in order to minimize the time to ramp up to the final angular-velocity 3V radians per second. In other words, the positive second derivative means the optimal time to perform the dynamic switching is determined, which is indeed the optimal solution for a 3-winding-configuration motor (the winding-configurations are defined in FIG. 8 below) going from 0 radians per second to 3V radians per second in the minimal, hence optimal, amount of time. In terms of introductory algebra, to help visualize this particular solution process, the total_time in equation (5) for a three winding-configuration motor is a simple parabola (a conic section) which is concave, meaning that it would "hold water" like a soup bowl. Taking the first derivative of the parabola with respect to X and setting that first derivative equal to zero, plus the fact that the second derivative of the parabola with respect to X is positive, results in the value of X=2 where the total_time in equation (5) is minimized and thus the performance of the three winding-configuration motor is optimized.

At this point, it is essential to introduce a generic value of "m" to denote the number of simultaneous, linear equations and to denote the number of unknowns, as will be used throughout the description. Also, it should be noted that "m=1" equations and "m=1" unknowns were used to derive the table in FIG. 8, as seen below, because the initial voltage and torque constant will always be the maximum K (voltage and torque constant) so that no voltage and/or torque constant go unused. Similarly, the final value of the voltage and torque constant is always K divided by the multiplicity "N" of angular-velocity V, hence K/3 (where N=3). The calculations are only determining X to define K/X which resulted in m=1 equation and m=1 unknown. Thus, there are m+2 winding-configurations in a motor analyzed by m simultaneous linear equation and m unknowns.

FIG. 8 is a table diagram 800 illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration. The voltage constant and torque constant show a maximal value of K, and then decrease in value to K/2, and finally to K/3 for the three winding-configurations progressing from initial winding-configuration-1 where all motor windings are used, winding-configuration-2 and winding-configuration-3 in successive order. The angular-acceleration shows a maximal value of A, and then decreases in value to A/2, and finally to A/3 for the three winding-configurations progressing from winding-configuration-1, winding-configuration-2 and winding-configuration-3 in successive order. The delta angular-velocity is V for each the three winding-configurations progressing from winding-configuration-1, winding-configuration-2 and winding-configuration-3 in successive order. The total angular-velocity increases from V, to XV=2V, to 3V for the three winding-configurations progressing from winding-configuration-1, winding-configuration-2 and winding-configuration-3 in successive order. The total angular velocity is the sum of the delta angular velocities, hence the total angular velocity for winding-configuration-2 is 2V=V+V, and the total angular velocity for winding-configuration-3 is 3V=V+V+V. The delta time is (V/A)=T, 2(V/A)=2T, and 3(V/A)=3T giving a total "optimal" time (summation of the delta times) of 6T seconds to ramp up (e.g., accelerate) to an angular-velocity of 3V radians per second.

Figure 10:
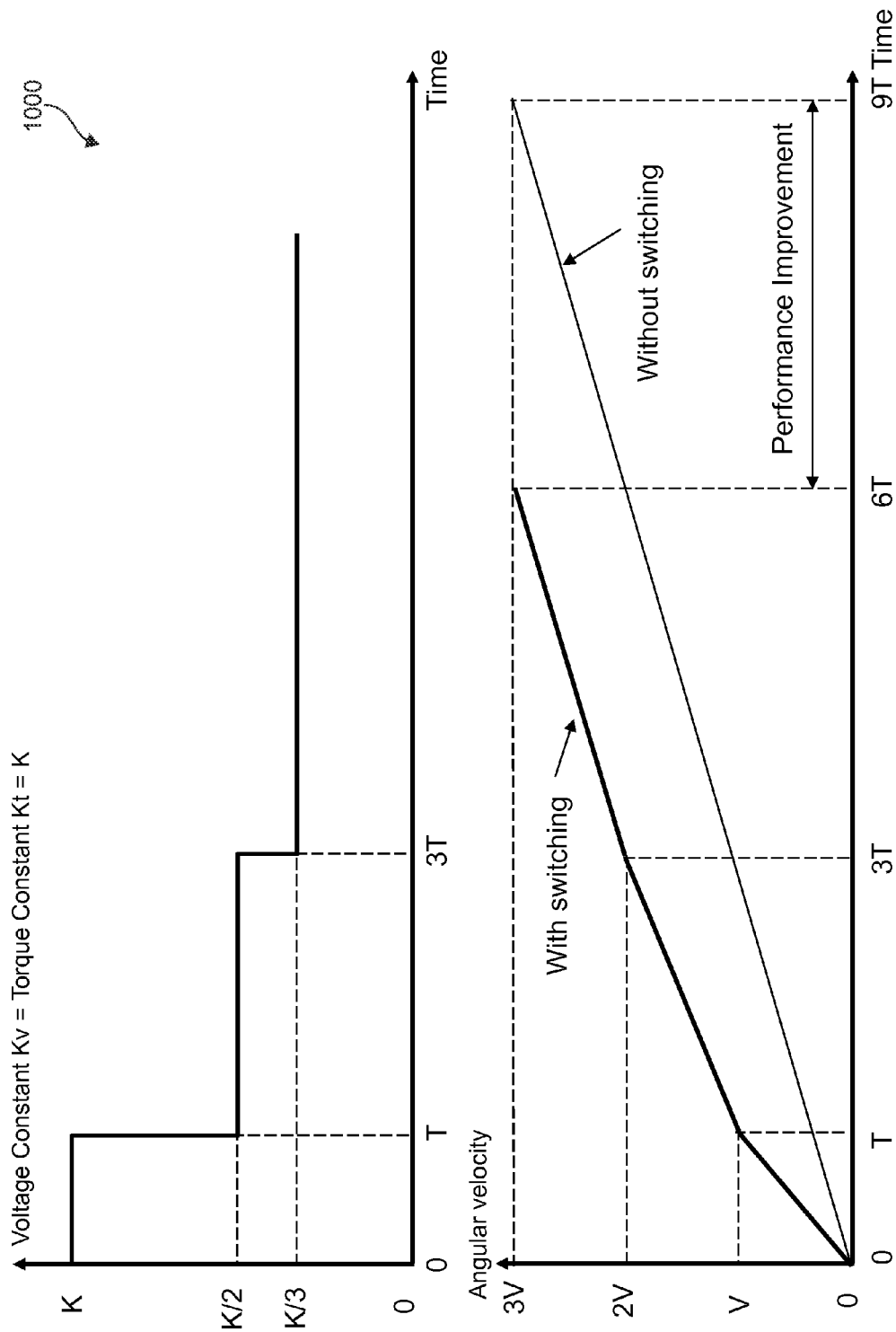
FIG. 10 is a graph diagram illustrating an exemplary operation for optimizing the dynamic reconfiguration-switching using a voltage constant as a function of the winding-configuration number "WC" using 3 winding-configurations.

FIG. 9 is a table diagram 900 illustrating an exemplary operation for optimizing the dynamic reconfiguration-switching using a voltage constant as a function of the winding-configuration number "WC" using 3 winding-configurations. Corresponding to FIG. 9, FIG. 10 is a graph diagram 1000 of FIG. 9, illustrating an exemplary operation for optimizing the dynamic reconfiguration-switching using a voltage constant as a function of the winding-configuration number "WC" using 3 winding-configurations. The voltage constant and torque constant show a maximal value of K, and then decrease in value to K/2, and finally to K/3 for the three winding-configurations progressing from winding-configuration-1 where all motor windings are used, winding-configuration-2 and winding-configuration-3 in successive order. The angular-acceleration shows a maximal value of A, and then decreases in value to A/2, and finally to A/3 for the three winding-configurations progressing from winding-configuration-1, winding-configuration-2 and winding-configuration-3 in successive order. The time when winding-configuration "WC" is in effect shows 0 to T, T to 3T, and 3T to 6T for the three winding-configurations progressing from winding-configuration-1, winding-configuration-2 and winding-configuration-3 in successive order. In other words, winding-configuration-1 is in effect from 0 to T and the motor windings are fully engaged for a maximal torque and voltage constant of K, and the motor is spinning up to an angular-velocity of V radians per second. When this angular-velocity V is reached, at time T, the motor windings are dynamically switched from winding-configuration-1 to winding-configuration-2 and the motor then operates at a lower voltage (and torque) constant K/2 and lower angular-acceleration A/2 to further increase its angular-velocity until it reaches a new angular-velocity 2V at time 3T. At time 3T, the dynamic switching is made from winding-configuration-2 to winding-configuration-3 and the motor then operates at still lower voltage (and torque constant) K/3 to further increase its angular-velocity until reaching a new angular-velocity 3V is reached at time 6T. The optimal, dynamic switching occurs when the velocity sensor of the electric motor detects that the electric motor is at the appropriate angular-velocity for such a switch in Kt and Kv. Without such a switch to reduce the voltage constant of the motor, the back-EMF of the motor would prohibit further increase of velocity beyond angular velocity V. Hence, the voltage constant of the motor is reduced to allow increased angular-velocity. Because the voltage constant and torque constant are equal (in SI units), changes to the motor torque-constant, which is equal to its voltage-constant, have an inverse relationship with the maximal angular-velocity of the motor, namely reducing the voltage constant increases the maximum attainable angular velocity (inversely proportional). However, if more angular acceleration is desired, additional windings are added, as there is a 1:1 relationship between the motor torque constant and angular-acceleration (directly proportional). Thus, the optimal switching algorithm allows the dynamic trade-off between higher angular-velocity and higher angular-acceleration.

FIG. 9 and FIG. 10 are neither geometric, powers of two, nor Fibonacci progressions. The optimal switching algorithm could be applied to tape drives, to make use of lower voltage power supplies, while still achieving high speed rewind. The optimal switching algorithm could be used in hard drive (HDD) motors, to achieve higher disk angular velocity while reducing motor heating. These same results could be used in electric cars, where the switching algorithm is effectively a 3-speed transmission, by way of example only, and thus eliminating the need for a separate transmission. With the switching algorithm described above it takes 6V/A (6T) seconds to accelerate to an angular-velocity of 3V radians per second, as seen in FIG. 9 and FIG. 10. Without the dynamical switching, it would take 9V/A (9T) seconds to accelerate to the same angular-velocity because a motor with a 3 times lower voltage constant would have to be employed to reach an angular-velocity of 3V radians per second. Thus, the mechanisms described herein, gain a significant advantage by employing dynamic-reconfiguration coil-switching within a electric motor, by using higher angular-acceleration at lower angular-velocity, and dynamically reducing the voltage-constant to keep accelerating, albeit at a lower angular-acceleration, to yield higher angular-velocity.

Having produced a methodology of m simultaneous equations and m unknowns, as described above, FIG. 11, below, analyzes a five-winding-configuration motor, one where five different voltage constants are used, which is a more complicated motor from the three-winding-configurations motor analyzed above. Turning now to FIG. 11, a table diagram 1100 illustrating exemplary derivation of the optimizing a dynamic reconfiguration-switching operations between individual motor windings and dynamically switching between a 5-winding-configuration motor for trading off angular-acceleration in favor of increased angular-velocity between each successive winding-configuration, with N=3, is depicted. FIG. 11 is a derivation of m+2=5, where m=3, winding-configuration switching algorithm, and N=3 is used to give numerical answers to the calculations. The Fig.'s described herein give the construction of a switching algorithm, assuming that the final angular-velocity is 3V radians per second (N=3). The voltage constant and torque constant show a maximal value of K, followed by K/X, K/Y, K/Z, and finally to K/3 for the five winding-configurations progressing from winding-configuration-1, winding-configuration-2, winding-configuration-3, winding-configuration-4, and winding-configuration-5 in successive order. The angular-acceleration shows a maximal value of A, followed by A/X, A/Y, A/Z, and then decreases in value to A/3 for the five winding-configurations progressing from winding-configuration-1, winding-configuration-2, winding-configuration-3, winding-configuration-4, and winding-configuration-5 in successive order. The delta angular-velocity is V, XV−V=(X−1)V, YV−XV=(Y−X)V, ZV−YV=(Z−Y)V, and 3V−ZV=(3−Z)V for the five winding-configurations progressing from winding-configuration-1, winding-configuration-2, winding-configuration-3, winding-configuration-4, and winding-configuration-5 in successive order. The maximal angular-velocity increases from V, XV, YV, ZV, and finally to 3V for the five winding-configurations progressing from winding-configuration-1, winding-configuration-2, winding-configuration-3, winding-configuration-4, and winding-configuration-5 in successive order. The delta time is (V/A), X*(X−1)*(V/A), Y*(Y−X)*(V/A), Z*(Z−Y)*(V/A), and 3*(3−Z)*(V/A) for the five winding-configurations progressing from winding-configuration-1, winding-configuration-2, winding-configuration-3, winding-configuration-4, and winding-configuration-5 in successive order. By adding up the right-most column (labeled as "Delta Time"), the total time to accelerate via the switching algorithm is expressed by the following single, algebraic, quadratic equation in unknowns X, Y, and Z:

$$\text{Total\_Time} = \left(\frac{V}{A}\right) * [1 + X*(X-1) + Y(Y-X)] + Z*(Z-Y) + 3(3-Z)], \quad (8)$$

where X, Y, and Z are unknown coefficients of the total time (equation 8) and are unitless, and the algebraic expression has the units of time from the quotient V/A, where V is the maximal angular-velocity and A is the angular-acceleration when all motor windings are engaged, and 3V is the final angular-velocity (N=3 used only as an example so that we get numerical answers). The unknown coefficients X, Y, and Z are unit-less and this algebraic expression has the units of time from the quotient V/A. (It should be noted that the variables X, Y, and Z may also be illustrated with other variable such as $X_1$, $X_2$, and $X_3$ as used and applied throughout the specification.) By successively differentiating the total time with respect to X, Y, and then Z, to find their optimal values by setting the respective derivatives to zero, these m=3 simultaneous linear equations (e.g., 3 simultaneous linear equations) are obtained and m=3 unknowns (e.g., 3 unknowns) are also obtained. In other words, by differentiating the total time with respect to X, Y, and Z to find optimal values of X, Y, and Z and setting each derivative for X, Y, and Z equal to zero, these m=3 simultaneous linear equations are attained:

$$d\left[\left(\frac{V}{A}\right) * \frac{[1 + X*(X-1) + Y(Y-X) + Z*(Z-Y) + 3(3-Z)]}{dx} \right] = \left(\frac{V}{A}\right)*[2X-1-Y] = 0, \quad (9)$$

$$d\left[\left(\frac{V}{A}\right) * \frac{[1 + X*(X-1) + Y(Y-X) + Z*(Z-Y) + 3(3-Z)]}{dx} \right] = \left(\frac{V}{A}\right)*[2Y-X-Z] = 0, \quad (10)$$

$$d\left[\left(\frac{V}{A}\right) * \frac{[1 + X*(X-1) + Y(Y-X) + Z*(Z-Y) + 3(3-Z)]}{dx} \right] = \left(\frac{V}{A}\right)*[2Z-Y-3] = 0, \quad (11)$$

whereby solving for X, Y, and Z yields an optimal value for each of X, Y, and Z. The m=3 simultaneous linear equations and m=3 unknowns to solve are shown below, and it should be noted that these simultaneous equations take on the form of a tridiagonal matrix, which is derived in a "general" form in FIG. 21. For simplicity, using the variables $X_1$, $X_2$, and $X_3$ respectively in place of the variables X, Y, and Z and also substituting equation 8 (total time) into the formula, these same equations (9), (10), and (11), may appear as:

$$d[(V/A)*\text{total time}]/dX_1 = (V/A)*[2X_1 - 1 - X_2] = 0, \quad (9B)$$

$$d[(V/A)*\text{total time}]/dX_2 = (V/A)*[2X_2 - X_1 - X_3] = 0, \quad (10B)$$

$$d[(V/A)*\text{total time}]/dX_3 = (V/A)*[2X_3 - X_2 - 3] = 0, \quad (11B)$$

The reason for the tridiagonal matrix is because each "interior" winding-configuration "j" in the electric motor is only affected by its neighboring winding-configuration "j−1" and "j+1," hence the coefficient matrix [A] has zero values everywhere except in the main diagonal, which is all 2's (e.g, the number "2"), and diagonals immediately adjacent to the main diagonal, which are both all −1's (e.g., the negative number "1"). In other words, the solution to the problem that is being solved uses matrix algebra with a characteristic form, namely a tridiagonal matrix. The coefficient matrix [A] is symmetric as well as tridiagonal. There are problems (but not in the present invention) that use "penta-diagonal" matrices and non-symmetric matrices, so being able to define the coefficient matrix of the present invention, as both tridiagonal and symmetric, are important mathematical properties of the present invention. Thus, the m=3 simultaneous linear equations and m=3 unknowns to solve results in these three simultaneous equations:

$$2X - Y = 1, \quad (12)$$

$$-X + 2Y - Z = 0, \quad (13)$$

$$-Y + 2Z = 3, \quad (14)$$

and these equations yield the solution vector as X=3/2, Y=2, and Z=5/2. This solution vector is then used in FIG. 12, below.

FIG. 12 is a table diagram 1200 illustrating an exemplary profile of the optimal switching calculation for optimizing dynamic winding reconfiguration-switching between individual motor windings in a 5-winding-configuration motor (e.g., WC=m+2=5 where m=3 as indicated above) for trading off acceleration in favor of increased angular-velocity between each successive winding-configuration. The voltage constant and torque constants dynamically decrease from their maximum value of K when all motor windings are engaged, to 2K/3, to K/2, to 2K/5, and finally to K/3 for the five winding-configurations progressing dynamically from winding-configuration-1, to winding-configuration-2, to winding-configuration-3, to winding-configuration-4, and finally to winding-configuration-5 in successive order. The angular-acceleration dynamically decreases from its maximum value of A, to 2A/3, to A/2, to 2A/5, and finally to A/3 for the five winding-configurations progressing dynamically from winding-configuration-1, to winding-configuration-2, to winding-configuration-3, to winding-configuration-4, and finally to winding-configuration-5 in successive order. The delta angular-velocity is V, V/2, V/2, V/2, and V/2 for the five winding-configurations progressing dynamically from winding-configuration-1, to winding-configuration-2, to winding-configuration-3, to winding-configuration-4, and finally to winding-configuration-5 in successive order. The total angular-velocity dynamically increases from V, to 3V/2, to 2V, to 5V/2, and finally to 3V for the five winding-configurations progressing dynamically from winding-configuration-1, to winding-configuration-2, to winding-configuration-3, to winding-configuration-4, and finally to winding-configuration-5 in successive order, and it is this increase in angular-velocity which is the desired result of the present invention. The total angular velocity is the sum of the respective delta angular velocities, hence the total angular velocity for winding-configuration-2 is 3V/2=V+V/2, the total angular velocity for winding-configuration-3 is 2V=V+V/2+V/2, the total angular velocity for winding-configuration-4 is 5V/2=V+V/2+V/2+V/2, and the total angular velocity for winding-configuration-5 is 3V=V+V/2+V/2+V/2+V/2.

Taking the second derivatives, of the total time in equation (8) with respect to X, Y, and Z (or using the variable $X_j$, where j is equal to 1, 2, 3 "j=1, 2, 3" as used and applied in the specification), all second-derivatives are equal to 2V/A which is positive, indicating that the present invention has solved for the optimal fractional voltage and torque constants, optimal angular velocities, and optimal times to switch to these optimal fractional voltage and torque constants.

$$d^2[(V/A)*[1+X*(X-1)+Y*(Y-X)+Z*(Z-Y)+3(3-Z)]/dX^2 = 2(V/A) > 0 \quad (15),$$

$$d^2[(V/A)*[1+X*(X-1)+Y*(Y-X)+Z*(Z-Y)+3(3-Z)]/dY^2 = 2(V/A) > 0 \quad (16),$$

$$d^2[(V/A)*[1+X*(X-1)+Y*(Y-X)+Z*(Z-Y)+3(3-Z)]/dZ^2 = 2(V/A) > 0 \quad (17),$$

or the following equation may be generically used where the variable $X_j$ replaces the variables X, Y, and Z:

$$d^2[(V/A)*\text{total\_time}]/dX_j^2 = 2(V/A) > 0 \quad (18)$$

The unknown coefficients X, Y, and Z (and/or $X_j$) are unitless, and the algebraic expression for total time in equation (8) has the units of time from the quotient V/A. By taking second derivatives of the total time with respect to X, Y, and Z, (and/or $X_j$) a positive-second derivative is achieved in each case, which indicates a minimal time and thus optimal time for performing the dynamic reconfiguration-switching to achieve an angular velocity of 3V. The delta time is T, where T=(V/A), 3T/4, T, 5T/4, and 3T/2 giving a total time of 11T/2 seconds to ramp up (e.g., accelerate) to an angular-velocity of 3V radians per second, where T is the total time, for the five winding-configurations progressing from winding-configuration-1, winding-configuration-2, winding-configuration-3, winding-configuration-4, and winding-configuration-5 in successive order. Thus, with a five-winding-configuration motor (e.g., m+2=5 "five" different voltage constants), the optimal total time to ramp up (e.g., accelerate) is 11T/2 (5.5T) seconds, which is slightly faster than the 6T seconds obtained by the optimal three-winding-configuration motor, and definitely faster than 9T seconds obtained for a motor with no switching (a one-winding-configuration motor). FIG. 12 provides the optimal solution for a five-winding-configuration motor, which is T/2 seconds faster improvement in ramp-up time versus the optimal solution for the three-winding-configuration motor.

FIG. 13 is a table diagram 1300 illustrating an exemplary operation for optimizing the dynamic reconfiguration-switching using a voltage constant as a function of the winding-configuration number "WC" using 5 winding-configurations (e.g., 5 states). The voltage constant and torque constant shows a maximal value of K, and then decrease in value to 2K/3, K/2, 2K/5, and finally to K/3 for the five winding-configurations progressing from winding-configuration-1 where all motor windings are used, winding-configuration-2, winding-configuration-3, winding-configuration-4, and finally winding-configuration-5 in successive order. The angular-acceleration shows a maximal value of A, and then decrease in value to 2A/3, A/2, 2A/5, and finally to A/3 for the five winding-configurations progressing from winding-configuration-1, winding-configuration-2, winding-configuration-3, winding-configuration-4, and winding-configuration-5 in successive order. The delta angular-velocity is V, V/2, V/2, V/2, and V/2 for the five winding-configurations progressing dynamically from winding-configuration-1, to winding-configuration-2, to winding-configuration-3, to winding-configuration-4, and finally to winding-configuration-5 in successive order. The angular-velocity successively increases from V, 3V/2, 2V, 5V/2, and finally to 3V for the five winding-configurations progressing from winding-configuration-1, winding-configuration-2, winding-configuration-3, winding-configuration-4, and winding-configuration-5 in successive order. The total angular velocity is the sum of the respective delta angular velocities, hence the total angular velocity for winding-configuration-2 is 3V/2=V+V/2, the total angular velocity for winding-configuration-3 is 2V=V+V/2+V/2, the total angular velocity for winding-configuration-4 is 5V/2=V+V/2+V/2+V/2, and the total angular velocity for winding-configuration-5 is 3V=V+V/2+V/2+V/2+V/2. The time when winding-configuration "WC" is in effect showing 0 to T, T to 7T/4, 7T/4 to 11T/4, 11T/4 to 4T, and 4T to 11T/2 for the five winding-configurations progressing from winding-configuration-1, winding-configuration-2, winding-configuration-3, winding-configuration-4, and winding-configuration-5 in successive order. In other words, winding-configuration-1 (e.g., switching-state) is from 0 to T and the motor windings are fully engaged for a voltage and torque constant of K, spinning up to angular-velocity V radians per second. When this angular-velocity V is reached, then at time T, the motor windings are dynamically switched from winding-configuration-1 to winding-configuration-2 and the motor then operates at a lower voltage (and torque) constant 2K/3 and lower angular-acceleration 2A/3 to further increase its angular-velocity until it reaches angular-velocity 3V/2 at time 7T/4. When this angular-velocity 3V/2 is reached, at time 7T/4, the motor windings are dynamically switched from winding-configuration-2 to winding-configuration-3 and the motor then operates still at a lower voltage and torque constant K/2, and subsequently still at a lower angular-acceleration, A/2, to further increase its angular-velocity time until it reaches angular-velocity 2V at 11T/4. When this angular-velocity 2V is reached, at time 11T/4, the motor windings are dynamically switched from winding-configuration-3 to winding-configuration-4 and the electric motor then operates still at a lower voltage and torque constant, 2K/5, and subsequently still at a lower angular-acceleration, 2A/5, to further increase its angular-velocity time until it reaches angular-velocity 5V/2 at 4T. When this angular-velocity 5V/2 is reached, at time 4T, the motor windings are dynamically switched from winding-configuration-4 to winding-configuration-5 and the electric motor then operates still at a lower voltage and torque constant, K/3, and subsequently still at a lower angular-acceleration, A/3, to further increase its angular-velocity time until it reaches angular-velocity 3V at 11T/2. The optimal, dynamic switching of individual motor windings occurs when the velocity sensor of the motor detects that the motor is at the appropriate angular-velocity for such a switch in Kt and Kv. Without such a switch to reduce the voltage constant of the motor, the back-EMF of the motor would prohibit further increase of velocity. Hence, the voltage constant of the motor is reduced to allow increased angular-velocity. Because the voltage constant and torque constant are equal (in SI units), changes to the motor torque-constant, which is equal to its voltage-constant, have an inverse relationship with the maximal angular-velocity of the motor, namely reducing the voltage constant increases the maximum attainable angular velocity (inversely proportional). However, if more angular acceleration is desired, additional windings are added, as there is a 1:1 relationship between the motor torque constant and angular-acceleration (directly proportional). Thus, the optimal switching algorithm allows the dynamic trade-off between higher angular-velocity and higher angular-acceleration.

As the speed of the electric motor is ramped up (e.g., accelerated), the motor torque constant, which is equal to the voltage constant in SI units and thus is equal to the angular-acceleration, monotonically decreases, as the angular-acceleration is traded-off for a higher maximum angular-velocity in that particular state. Thus, the m simultaneous-equations, with m unknowns (e.g., multiple unknowns represented by the variable "m") as described in FIGS. 7-13, are used to solve for the optimal switching voltage constants and determine at what optimal angular-velocity to perform the dynamic switching of the individual motor windings and transition between the multiple winding-configurations, going from one winding-configuration to the next in a sequential order. The number of equations to solve increases, starting from one equation for a three-winding-configuration motor, and adding an additional simultaneous equation for each additional winding-configuration (each additional change in voltage constant) added beyond that to whichever winding-configuration that is desired. Thus, as illustrated in FIGS. 11 and 12, there are three linear equations with three unknowns for the five-winding-configuration electric motor. More generically for example, for performing the dynamic reconfiguration-switching of motor windings in WC=5 winding-configurations and higher numbers of winding-configuration "WC", a tri-diagonal set of equations would be used. Also, the only progression followed by the voltage constants and torque constants in FIG. 12, is one of a monotonically decreasing progression.

As will be illustrated below, further analysis is provided for two-winding-configurations (2 different voltage constants) and four-winding-configurations (4 different voltage constants) showing improved performance. An optimal two-winding-configuration motor (e.g. m+2=2 where m=0) is analyzed in FIG. 14, giving a total time to reach an angular-velocity of 3V radians per second as 7T seconds, which is an improvement over the 9T seconds required by a single voltage constant (no change in voltage constant) motor. There are no equations and no unknowns here in the two-state, as there are too few winding-configurations (e.g., m=0 so there are no equations and no unknowns to be solved). The initial voltage and torque constant is K and the final voltage and torque constant is K/3.

FIG. 14 is a table diagram 1400 illustrating an exemplary operation for optimizing the dynamic reconfiguration-switching using a voltage constant as a function of the winding-configuration number "WC" using 2 winding-configurations, with N=3. The voltage constant and torque constant show a maximal value of K, and then decrease in value to K/3 for the two winding-configurations progressing from winding-configuration-1 to winding-configuration-2 in successive order. The angular-acceleration shows a maximal value of A, and then decreases in value to A/3 for the two winding-configurations progressing from winding-configuration-1 to winding-configuration-2 in successive order. The total angular-velocity increases from V to 3V for the two winding-configurations progressing from winding-configuration-1 to winding-configuration-2 in successive order. The time when winding-configuration "WC" is in effect shows the dynamic switching of the motor windings occurring between winding-configuration-1, which is 0 to T, and winding-configuration-2, which is T to 7T, for the two winding-configurations progressing from winding-configuration-1 to winding-configuration-2 in successive order. In other words, winding-configuration-1 is from 0 to T and the motor windings are fully engaged, spinning up to angular-velocity V radians per second. When this angular-velocity V is reached, then at time T, the motor windings are dynamically switched from winding-configuration-1 to winding-configuration-2 and the electric motor then operates at a lower voltage (and torque) constant K/3 and lower angular-acceleration A/3 to further increase its angular-velocity until it reaches angular-velocity 3V at time 7T. The optimal, dynamic switching occurs when the velocity sensor of the electric motor detects that the electric motor is at the appropriate angular-velocity for such a switch in Kt and Kv. Without such a switch to reduce the voltage constant of the motor, the back-EMF of the motor would prohibit further increase of velocity. Hence, the voltage constant of the motor is reduced to allow increased angular-velocity. Because the voltage constant and torque constant are equal in SI units, changes to the motor torque-constant (which is equal to its voltage-constant) are directly proportional with the angular-acceleration of the motor and inversely proportional to the total angular velocity. Thus, the optimal switching algorithm allows the dynamic trade-off between higher angular-velocity and higher angular-acceleration to reach the maximum angular velocity in the minimal amount of time.

Turning now to FIG. 15, a table diagram 1500 illustrating an exemplary derivation of the optimal switching calculation is depicted for optimizing a dynamic reconfiguration-switching between individual motor windings and dynamically switching between a 4-winding-configuration motor for trading off angular-acceleration in favor of increased angular-velocity between each successive winding-configuration, with N=3. FIG. 15 is a derivation of m+2=4 winding-configurations optical switching algorithm, where m=2. FIG. 15 analyzes a four-winding-configuration motor, where four different voltage constants are used, which is a more complicated motor from the three-winding-configuration motor analyzed above. The table gives the construction of a switching algorithm, assuming that the final angular-velocity is 3V radians per second. The voltage constant and torque constant show a maximal value of K, and then decrease in value to K/X, K/Y, and finally to K/3 for the four winding-configurations progressing from winding-configuration-1, winding-configuration-2, winding-configuration-3, and winding-configuration-4 in successive order. The angular-acceleration shows a maximal value of A, and then decreases in value to A/X, A/Y, and finally to A/3 for the four winding-configurations progressing from winding-configuration-1, winding-configuration-2, winding-configuration-3, and winding-configuration-4 in successive order. The delta angular-velocity is V, XV−V=(X−1)V, YV−XV=(Y−X)V, 3V−YV=(3−Y)V for the four winding-configurations progressing from winding-configuration-1, winding-configuration-2, winding-configuration-3, and winding-configuration-4 in successive order. The maximal angular-velocity increases from V, XV, YV, and finally to 3V for the four winding-configurations progressing from winding-configuration-1, winding-configuration-2, winding-configuration-3, and winding-configuration-4 in successive order. The delta time is (V/A), X*(X−1)*(V/A), Y*(Y−X)*(V/A), and 3*(3−Z)*(V/A) for the four winding-configurations progressing from winding-configuration-1, winding-configuration-2, winding-configuration-3, and winding-configuration-4 in successive order. (It should be noted that the variables X and Y may also be illustrated with other variable such as $X_1$, and $X_2 \cdot X_1$ and $X_2$)

By adding up the right-most column (labeled as "Delta Time"), the total time to accelerate via the switching algorithm is expressed by the following simple, algebraic, and quadratic equation in X and Y:

$$\text{Total Time} = \left(\frac{V}{A}\right)*[1 + X*(X-1) + Y(X-1)] + Y*(Y-X) + 3(3-Y)], \quad (19)$$

where X and Y are unknown coefficient of the total time and are unitless, and the algebraic expression for total time has the units of time from the quotient V/A, V is the maximal angular-velocity and A is the angular-acceleration when all motor windings are being used, 3V radians per second is the final angular-velocity (N=3 is used only as an example). By successively differentiating the total time with respect to X and Y to find optimal values of X and Y and setting the derivatives for X and Y equal to zero, these m=2 equations (e.g., 2 equations) and m=2 unknowns are attained:

$$d\left[\left(\frac{V}{A}\right)*\frac{[1 + X*(X-1) + Y(Y-X) + 3(3-Y)]}{dx}\right] = \quad (20),$$
$$\left(\frac{V}{A}\right)*[2X - 1 - Y] = 0,$$

$$d\left[\left(\frac{V}{A}\right)*\frac{[1 + X*(X-1) + Y(Y-X) + 3(3-Y)]}{dx}\right] = \quad (21),$$
$$\left(\frac{V}{A}\right)*[2Y - X - 3] = 0,$$

whereby solving for X and Y yields an optimal value for X and Y. The unknown coefficients X and Y are unitless and these algebraic expressions have the units of time from the quotient V/A. By taking second derivatives of the total time with respect to X and Y, a positive-second derivative (2V/A) is achieved in each case, which indicates a minimal-optimal time for performing the dynamic reconfiguration-switching. For simplicity, using the variables $X_1$, and $X_2, X_1$ and $X_2$ $X_1$ and $X_2$ respectively in place of the variables X and Y and also substituting equation 19 (total time) into the formula, these same equations (20) and (21), may appear as:

$$d[(V/A)*[\text{total\_time}]/dX_1 = (V/A)*[2X_1 - 1 - X_2] = 0, \quad (20B),$$

$$d[(V/A)*[\text{total\_time}]/dX_2 = (V/A)*[2X_2 - X_1 - 3] = 0, \quad (21B),$$

and the m=2 simultaneous equations to solve are only the top and bottom rows of the general tridiagonal matrix solved for in the table of FIG. 21, which results in the two simultaneous equations to solve as:

$$2X - Y = 1, \quad (22),$$

$$-X + 2Y = 3, \quad (23),$$

and these equations yield a solution vector as X=5/3 and Y=7/3. This solution vector is then used in FIG. 16, below.

FIG. 16 is a table diagram 1600 illustrating an exemplary profile of optimizing a dynamic reconfiguration-switching between individual motor windings in a 4-winding-configuration (e.g., m+2=4, where m=3, as described above) motor for trading off acceleration in favor of increased angular-velocity between each successive winding-configuration. The voltage constant and torque constant show a maximal value of K, and then decrease in value to 3K/5, 3K/7, and finally to K/3 for the four winding-configurations progressing from winding-configuration-1 when all motor windings are used, winding-configuration-2, winding-configuration-3, and winding-configuration-4 in successive order. The angular-acceleration shows a maximal value of A, and then decreases in value to 3A/5, 3A7, and finally to A/3 for the four winding-configurations progressing from winding-configuration-1, winding-configuration-2, winding-configuration-3, and winding-configuration-4 in successive order. The delta angular-velocity is V, 2V/3, 2V/3, and 2V/3 for the four winding-configurations progressing from winding-configuration-1, winding-configuration-2, winding-configuration-3, and winding-configuration-4 in successive order. The total angular velocity increases from V, 5V/3, 7V/3, and finally to 3V for the four winding-configurations progressing from winding-configuration-1, winding-configuration-2, winding-configuration-3, and winding-configuration-4 in successive order. The total angular velocity is the sum of the respective delta angular velocities, hence the total angular velocity for winding-configuration-2 is 5V/3=V+2V/3, the total angular velocity for winding-configuration-3 is 7V/3=V+2V/3+2V/3, the total angular velocity for winding-configuration-4 is 3V=V+2V/3+2V/3+2V/3. The delta time is T, where T=(V/A), 10T/9, 14T/9, and 2T giving a total time of 51T/9 seconds to ramp up (e.g., accelerate) to an angular-velocity of 3V radians per second, where 51T/9 is the total time for the four winding-configurations progressing from winding-configuration-1, winding-configuration-2, winding-configuration-3, and winding-configuration-4 in successive order. Taking second derivatives of the total time for X and Y, both second-derivatives are positive (and equal to each other), indicating the solutions of X and Y provide the optimal fractional voltage and torque constants, optimal angular velocities, and optimal times to switch to these optimal fractional voltage and torque constants:

$$d^2[(V/A)*[1+X*(X-1)+Y*(Y-X)+3(3-Y)]/dX^2 = 2(V/A) > 0 \quad (24),$$

$$d^2[(V/A)*[1+X*(X-1)+Y*(Y-X)+3(3-Y)]/dY^2 = 2(V/A) > 0 \quad (25),$$

or the following equation may be used generically where the variable $X_j$ (where j=1 or 2) replaces the variables X and Y, as in equation (19) and (20):

$$d^2[(V/A)*[\text{total\_time}]/dX_j^2 = 2(V/A) > 0 \quad (26),$$

thus, with a four-winding-configuration motor (four different voltage constants), the optimal total time to ramp up (e.g., accelerate) is 51T/9 (5.67T) seconds which is slower than 11T/2 (5.5T) seconds for a five-winding-configuration motor, but faster than the 6T seconds obtained by the optimal three-winding-configuration motor, and also faster than 9T seconds obtained for a motor with no switching (a one-winding-configuration motor). To visualize this particular solution process, the total_time in equation (19) for a four winding-configuration motor is a parabolic surface (like the reflective surface of a telescope mirror or an automobile headlight) which is concave, meaning that it would "hold water" like a soup bowl. Taking the first derivatives of the parabola with respect to X and Y and setting those first derivatives equal to zero, plus the fact that the second derivatives of the parabola with respect to X and Y are positive, results in the values of X=5/3 and Y=7/3 where the total_time in equation (19) is minimized and thus the performance of the four winding-configuration motor is optimized.

FIG. 17 is a table diagram 1700 illustrating an exemplary operation for optimizing the dynamic reconfiguration-switching using a voltage constant as a function of the winding-configuration number "WC" using 4 winding-configurations (e.g., 4 switching-states). As the speed of the electric motor is ramped up, the motor torque constant, which is equal to the voltage constant in SI units and thus is equal to the angular-acceleration, monotonically decreases, as the angular-acceleration is traded-off for a higher maximum angular-velocity in that particular state. The voltage constant and torque constant show a maximal value of K, and then decrease in value to 3K/5, 3K/7, and finally to K/3 for the four winding-configurations progressing from winding-configuration-1 where all motor windings are used, winding-configuration-2, winding-configuration-3, and winding-configuration-4 in successive order. The angular-acceleration shows a maximal value of A, and then decrease in value to 3A/5, 3A/7, and finally to A/3 for the four winding-configurations progressing from winding-configuration-1, winding-configuration-2, winding-configuration-3, and winding-configuration-4 in successive order. The delta angular-velocity is V, 2V/3, 2V/3, and 2V/3 for the four winding-configurations progressing from winding-configuration-1, winding-configuration-2, winding-configuration-3, and winding-configuration-4 in successive order. The total angular-velocity increases from V, 5V/3, 7V/3, finally to 3V for the four winding-configurations progressing from winding-configuration-1, winding-configuration-2, winding-configuration-3, and winding-configuration-4 in successive order. The total angular velocity is the sum of the respective delta angular velocities, hence the total angular velocity for winding-configuration-2 is 5V/3=V+2V/3, the total angular velocity for winding-configuration-3 is 7V/3=V+2V/3+2V/3, the total angular velocity for winding-configuration-4 is 3V/=V+2V/3+2V/3+2V/3. The time when winding-configuration "WC" is in effect shows the dynamic switching of the motor windings occurring between winding-configuration-1, which is 0 to T, and winding-configuration-2, which is T to 19T/9, and winding-configuration-2 and winding-configuration-3, which is 19T/9 to 33T/9, and winding-configuration-3 and winding-configuration-4, which is 33T/9 to 51T/9, for the four winding-configurations progressing from winding-configuration-1, winding-configuration-2, winding-configuration-3, and winding-configuration-4 in successive order. In other words, winding-configuration-1 (e.g., switching-state) is from 0 to T and the motor windings are fully engaged, resulting in a torque constant and voltage constant of K, spinning up to angular-velocity V radians per second. When this angular-velocity V is reached, then at time T, the motor windings are dynamically switched from winding-configuration-1 to winding-configuration-2 and the electric motor then operates at a lower voltage (and torque) constant 3K/5, and lower angular-acceleration 3A/5, to further increase its angular-velocity until it reaches angular-velocity 5V/3 at time 19T/9. When this angular-velocity 5V/3 is reached, at time 19T/9, the motor windings are dynamically switched from winding-configuration-2 to winding-configuration-3 and the electric motor then operates still at a lower voltage and torque constant 3K/7, and subsequently still at a lower angular-acceleration, 3A/7, to further increase its angular-velocity time until it reaches angular-velocity 7V/3 at 33T/9. When this angular-velocity 7V/3 is reached, at time 33T/9, the motor windings are dynamically switched from winding-configuration-3 to winding-configuration-4 and the electric motor then operates still at a lower voltage and torque constant, K/3, and subsequently still at a lower angular-acceleration, A/3, to further increase its angular-velocity time until it reaches angular-velocity 3V at 51T/9. The optimal, dynamic switching of individual motor windings occurs when the velocity sensor of the motor detects that the motor is at the appropriate angular-velocity for such a switch in Kt and Kv.

Figure 19:
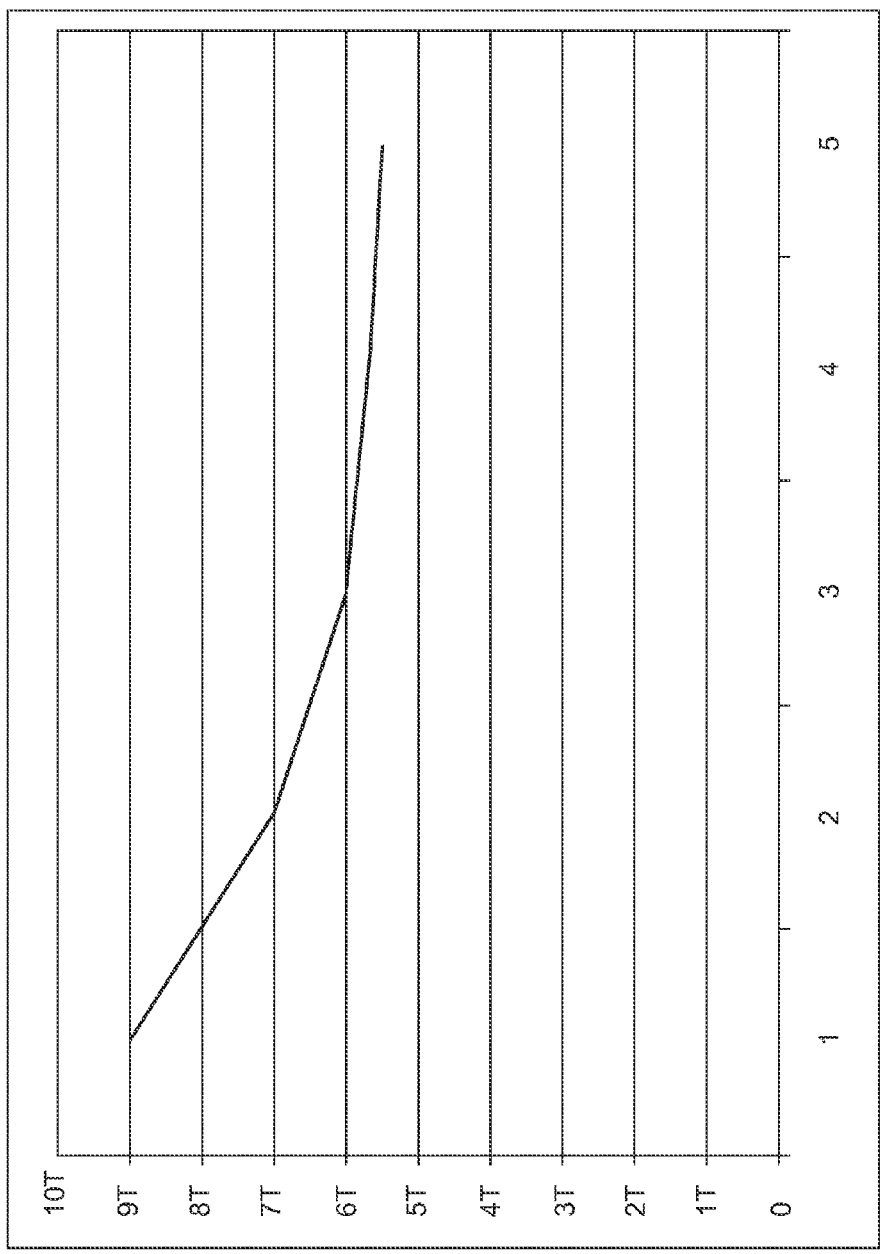
FIG. 19 is a graph diagram summarizing FIGS. 7-17 in terms of the total time to ramp up to an angular velocity of 3V versus the total number of available winding-configurations, where T=V/A.

FIG. 18 is a table diagram summarizing FIGS. 7-17 in terms of the total time to ramp up to an angular velocity of 3V versus the total number of available winding-configurations, where T=V/A. FIG. 19 is a graph diagram summarizing FIGS. 7-17 in terms of the total time to ramp up to an angular velocity of 3V versus the total number of available winding-configurations, where T=V/A. For a motor with only one winding-configuration, the total ramp up to 3V radians per second (the multiplication of V by N=3 is only used only as an example) is 9T seconds, as shown in FIG. 10. In decimal form this equates to 9T. For a motor with two winding-configurations (2 switching-states), the total ramp up time (acceleration phase) to 3V radians per second is 7T seconds, as shown in FIG. 14. In decimal form this equates to 7T. For a motor with three winding-configurations (e.g., 3 switching-states), the total ramp up to 3V radians per second is 6T seconds, as shown in FIG. 8. In decimal form this equates to 6T. For a motor with four winding-configurations (e.g., 4 switching-states), the total ramp up to 3V radians per second is 51T/9 seconds, as shown in FIG. 16. In decimal form this equates to 5.67T. For a motor with five winding-configurations (e.g., 5 switching-states), the total ramp up to 3V radians per second is 11T/2 seconds, as shown in FIG. 12. In decimal form this equates to 5.5T. Thus, the more winding configurations that are physically available for switching, the lower the total time to accelerate to the final angular velocity of 3V radians per second. However, the incremental change in total time to accelerate to the final angular velocity of 3V radians per second diminishes as more winding configurations are added.

As illustrated in column 1 (labeled as the total number of WC), the total number of available winding configurations are 1, 2, 3, 4, and 5. As stated above, the total time for a motor only having 1 winding configuration is 9T. But a motor with 2 winding configurations has a total time of 7T. Thus, as more available winding configurations are added to the motor, the faster it reaches its 3V angular velocity. The idea here is that as the motor has more winding configurations to choose from, the total time is reduced, and this is illustrated in both FIGS. 18 and 19. An analogy to a car having a manual transmission may be used for illustration purposes. For example, if a user desires to accelerate faster to 75 mph in the car, the car having a 4-speed transmission would reach the desired speed faster than a car having a 3-speed transmission. Similarly, the car having a 5-speed transmission would reach the desired speed faster than a car having a 4-speed transmission. This analogy is exactly what FIGS. 18 and 19 are illustrating with the motor having the various winding configurations.

Turning now to FIG. 20, a table diagram 2000 illustrating an exemplary derivation of a 3-winding-configuration optimal switching algorithm for optimizing a dynamic reconfiguration-switching between individual motor windings and dynamically switching between a 3-winding-configuration motor for trading off acceleration in favor of increased angular-velocity between each successive winding-configuration is depicted, now generalizing with N being a variable rather than the special case of N=3. FIG. 20 provides the construction of the switching algorithm, assuming that the final angular-velocity is "NV" radians per second (N being an arbitrary valued multiplier. N previously had been 3, as illustrated above, to allow calculations to have numerical answers.) and m+2=3 (e.g., three) winding-configurations are used to illustrate a generalization of the optimal switching algorithm for any high speed angular-velocity, rather than the 3V radians per second, as illustrated above. For example, the use of 3V (e.g., N=3) came from the IBM® 3480 tape drive which had a high speed rewind three times that of a normal read-write velocity.

By adding up the right-most column (labeled as "Delta Time"), the total time to accelerate via the switching algorithm is expressed by the following single, algebraic, and quadratic equation in unknown X:

$$\text{Total Time} = \left(\frac{V}{A}\right) * [1 + X * (X-1) + N(N-X)], \quad (27)$$

where X is unknown coefficient and is unitless, and the algebraic expression for total_time has the units of time from the quotient V/A, V is the maximal angular-velocity, and A is the angular-acceleration when all motor windings are being used, N is an arbitrary value greater than unity (e.g., N=3 as used above for illustration purposes for the previous calculations) representing a multiplier of the angular-velocity V to give the final angular-velocity as NV, and X is an unknown coefficient.

By differentiating the total time with respect to X, to find the optimal value of X, and setting that derivative to zero, the following linear equation is attained:

$$d\left[\left(\frac{V}{A}\right) * \frac{[1 + X*(X-1) + N(N-X)]}{dx}\right] = \left(\frac{V}{A}\right) * [2X - 1 - N] = 0, \quad (28)$$

whereby solving for X yields the unknown value of X, it is determined that X equals (N+1)/2. By taking a second derivative of the total time with respect to X, the second derivative is derived to be:

$$\frac{2V}{A} > 0, \quad (29)$$

whereby this positive-second derivative which is achieved, indicates that the solution for X provides an optimal time for performing the dynamic reconfiguration-switching of the motor windings to achieve the minimal time to achieve an angular-velocity of NV. Because the second derivative is positive, the minimum time (e.g., the minimal-optimal time) to perform the dynamic reconfiguration-switching of the motor windings is determined, which is indeed the optimal solution for a 3-winding-configuration motor going from 0 radians per second to NV radians per second. In other words, because the second derivative is positive, the second derivative with respect to X means (a) the value of the K/X equals 2K/(N+1) to switch to, (b) the time and angular-velocity to switch from K to 2K/(N+1), and (c) the time and angular-velocity to switch from 2K/(N+1) to K/N are optimal, in order to minimize the time to ramp up to the final angular-velocity NV is determined. These results are consistent with above calculations where N=3 was used. In terms of introductory algebra, to help visualize this particular solution process, the total_time in equation (27) for a three winding-configuration motor is a simple parabola (a conic section) which is concave, meaning that it would "hold water" like a soup bowl. Taking the first derivative of the parabola with respect to X and setting that first derivative equal to zero, plus the fact that the second derivative of the parabola with respect to X is positive, results in the value of X=(N+1)/2 where the total_time in equation (27) is minimized and thus the performance of the three winding-configuration motor is optimized. This value of X=(N+1)/2 is equivalent to the value of X=2 for the special case of N=3 for the total_time equation (5).

FIG. 21 is a table diagram 2100 illustrating an exemplary and fully generalized derivation of a (m+2)-winding-configuration optimal switching algorithm for a final velocity of NV, where V is the maximum angular-velocity for the full voltage and torque constant K. By adding up the right-most column in the table of FIG. 21, the total time to accelerate via our switching algorithm is expressed by this single algebraic expression for total time which is quadratic in each unknown $X_1, X_2, X_3, \ldots, X_m$:

$$\text{Total Time} = (V/A)*[1 + X_1*(X_1-1) + X_2*(X_2-X_1) + X_3* \\ (X_3-X_2) + \ldots + X_m*(X_m-X_{m-1}) + N*(N-X_m)] \quad (30),$$

where $\{X\}$ is the vector of unknown $X_1, X_2, X_3, \ldots, X_m$ that are unitless, and this single algebraic expression for total time has the units of time from the quotient V/A, and N is an arbitrary multiplier representing the final angular-velocity NV, and X is an unknown coefficient of the total time. By successively differentiating the total_time with respect to $X_1$, $X_2, X_3, \ldots X_m$, to find their optimal values by setting the respective derivatives to zero, these m simultaneous equations and m unknowns are attained:

$$d[(V/A)*\text{Total\_Time}]/dX_1 = (V/A)*[2X_1 - 1 - X_2] = 0 \quad (31),$$

$$d[(V/A)*\text{Total\_Time}]/dX_j = (V/A)*[2X_j - X_{j-1} - X_{j+1}] = 0 \\ \text{for } j = 2 \ldots m-1 \quad (32),$$

$$d[(V/A)*\text{Total\_Time}]/dX_m = (V/A)*[2X_m - X_{m-1} - N] = 0 \quad (33),$$

and taking second derivatives, of total time for $X_1, X_2, X_3, \ldots X_m$, all second-derivatives are positive (and equal to each other), indicating that the present invention has solved for the optimal fractional voltage and torque constants, optimal angular velocities, and optimal times to switch to these optimal fractional voltage and torque constants, by using the following equations for the taking the second derivative, which are positive (e.g., greater than zero):

$$d^2[(V/A)*\text{Total\_Time}]/dX_1^2 = 2(V/A) > 0 \quad (34),$$

$$d^2[(V/A)*\text{Total\_Time}]/dX_j^2 = 2(V/A) > 0 \text{ for } j = 2 \ldots \\ m-1 \quad (35),$$

$$d^2[(V/A)*\text{Total\_Time}]/dX_m^2 = 2(V/A) > 0 \quad (36),$$

or the following equation may generically used where the variable $X_j$ is used and replaces the variables $X_1$, $X_j$, $X_m$, as used in equations (34), (35), and (36):

$$d^2[(V/A)*[\text{Total\_Time}]/dX^2 = 2(V/A) > 0 \text{ for } j=1 \ldots m \quad (37)$$

Figure 22:
FIG. 22 is a matrix diagram illustrating an exemplary tridiagonal coefficient matrix [A]

The m simultaneous linear equations to solve for the m unknowns are (31), (32), and (33). These m simultaneous linear equations form a tridiagonal system of equations where all entries of the coefficient matrix are 2 along the main diagonal, and −1 along the diagonals immediately adjacent the main diagonal, and all other entries in the coefficient matrix are zero. As stated before, coefficient matrix [A] is symmetric as well as tridiagonal, meaning that coefficient matrix [A] has specific mathematical characteristics. The m simultaneous linear equations to solve for the m unknowns are:

$$2X_1 - X_2 = 1, \quad (38)$$

$$-X_{j-1} + 2X_j - X_{j+1} = 0 \text{ for } j = 2 \ldots m-1, \quad (39)$$

$$-X_{m-1} + 2X_m = N, \quad (40)$$

where these simultaneous linear equations to be solved are placed in the tridiagonal coefficient matrix [A], as seen in FIG. 22.

FIG. 22 is a matrix diagram 2200 illustrating an exemplary tridiagonal coefficient matrix [A]. Here, [A] {X}={b} is a set of m linear equations and m unknowns. The tridiagonal coefficient matrix [A] organizes the m simultaneous-linear equations having the m number of unknown variables into a tridiagonal system of linear equations, a coefficient matrix of the tridiagonal system of linear equations having 2's along an entire main diagonal of the coefficient matrix, negative 1's along diagonals immediately adjacent to the main diagonal, all other entries of the coefficient matrix being zero, and a right-hand-side vector {b} comprising a first entry of 1, a last entry of N denoting NV, which is N times a maximum allowable angular-velocity V of the motor at a one hundred percent torque constant K, and all other entries of the right-hand-side vector {b} being zero. The reason for the tridiagonal matrix is because each "interior" winding-configuration "j" in the electric motor is only affected by its neighboring winding-configuration "j−1" and "j+1," hence the coefficient matrix [A] has zero values everywhere except in the main diagonal, which is all 2's (e.g., the number "2"), and diagonals immediately adjacent to the main diagonal, which are both all −1's (e.g., the negative number "1"). All other elements in coefficient matrix [A] are zero. In other words, the solution to the problem that is being solved uses matrix algebra with a characteristic form, namely a tridiagonal matrix. The coefficient matrix [A] is symmetric as well as tridiagonal. $X_1$, $X_2$, $X_3$, ... $X_m$ are shown as the unknown variable of X, and the right hand side vector {b} shows 1, 0, 0, 0, 0, ... N respectively. It should be noted that all examples described herein are special cases of this generalized matrix approach. For example, the first derivation for tables of FIGS. 11-13, N=3 and m=3 (m+2=5 winding-configuration motor). Please note that m is an independent integer and N has any positive value greater than unity (N need not be an integer).

One of the values of coefficient matrix [A] being both symmetric and tridiagonal is that a simple solution algorithm can be written, one decidedly less complicated than if coefficient matrix [A] was fully populated with non-zero elements which did not fit any pattern. For example, a solution algorithm may begin with the calculation of factors $F_j$ and The order of the progression is starting from index j equals 1 and ending at j equals m. In other words, the calculation of factors $F_j$ and $G_j$ are calculated by the following recursive algorithm:

$$F_1 = 2 \text{ and } G_1 = \frac{1}{2}, \quad (41)$$

$$F_j = 2 - 1/F_{j-1} \text{ from } j=2 \text{ to } m, \quad (42)$$

$$G_j = G_{j-1}/F_j \text{ from } j=2 \text{ to } m-1, \text{ and} \quad (43)$$

$$G_m = (N + G_{m-1})/F_m, \quad (44)$$

as will be shown below in FIG. 25.

The elements of solution vector {$X_j$} are now obtained, with the order of the progression in the reverse direction, namely starting from index j equals m and ending at j equals 1, $X_m = G_m$, $X_j = G_j + X_{j+1}/2$. Thus, the solution vector {$X_j$} is now in a simple algorithm, for m≥2 (e.g., m is greater than and/or equal to two), since that is the lowest value of m yielding a coefficient matrix [A] with multiple simultaneous linear equations and multiple unknowns. If m=1, there is only one equation to be solved and the above upper-triangularization and back-substitution algorithm is unnecessary. Also, the solution for m=1 from tables as seen in FIG. 18-20, is already obtained, being X=(N+1)/2.

At this point, a need exists to analyze the case for m=1 equation and m=1 unknown. The following Fig.'s give the construction of the switching algorithm, assuming that the final angular-velocity is NV (N is an undetermined constant greater than unity) and m+2=3 winding-configurations are used, and there is only m=1 equation and m=1 unknown, hence the tridiagonal matrix approach of FIG. 21 is not used for a simple algebra problem. FIG. 23, below, is established with the help of FIG. 20, which has already been discussed.

FIG. 23 is a table diagram 2300 illustrating an exemplary profile of the optimal switching calculation for optimizing a dynamic reconfiguration-switching between individual motor windings in a 3-winding-configuration motor for trading off acceleration in favor of increased angular-velocity between each successive winding-configuration where X=(N+1)/2. In FIG. 23, the variable X, which is and unknown coefficient and is unitless, and the algebraic expression for total time has the units of time from the quotient V/A. The voltage constant and torque constant show a maximal value of K, and then decrease in value to 2K/(N+1), and finally to K/N for the three winding-configurations progressing from winding-configuration-1 where all motor windings are used, winding-configuration-2 and winding-configuration-3 in successive order. The angular-acceleration shows a maximal value of A, and then decreases in value to 2A/(N+1), and finally to A/N for the three winding-configurations progressing from winding-configuration-1, winding-configuration-2 and winding-configuration-3 in successive order. The delta angular-velocity is V, (N−1)V/2, and (N−1)V/2 for the three winding-configurations progressing from winding-configuration-1, winding-configuration-2 and winding-configuration-3 in successive order. The total angular-velocity increases from V, to (N−1)V/2, and finally NV for the three winding-configurations progressing from winding-configuration-1, winding-configuration-2 and winding-configuration-3 in successive order. The total angular velocity is the sum of the respective delta angular velocities, hence the total angular velocity for winding-configuration-2 is (N+1)V/2=V+(N−1)V/2, and the total angular velocity for winding-configuration-3 is NV=V+(N−1)V/2+(N−1)V/2. The delta time is $$(V/A) = T, \frac{(N^2-1)T}{4}, \text{ and } \frac{(N^2-N)T}{2},$$

giving a total time to accelerate up to an angular-velocity of NV as $$\frac{(3N^2 - 2N + 3)T}{4},$$

which is faster than the $N^2T$ required without coil switching, again, where $$T = V/A \text{ and } \frac{(3N^2 - 2N + 3)T}{4},$$

is the total time, for the three winding-configurations progressing from winding-configuration-1, winding-configuration-2 and winding-configuration-3 in successive order.

Thus, as illustrated in Fig.'s above, in one embodiment, the present invention performs this process for a motor with WC-winding-configurations, where WC=m+2, of the electric motor in order to optimally achieve an angular-velocity NV which is N times a capability of the electric motor with a one hundred percent torque constant and voltage constant K. Calculating an optional time for performing the dynamic reconfiguration-switching by first finding a total time for acceleration to an angular velocity of NV and differentiating that total time with respect to vector of unknowns {X} and setting each of those first derivatives to zero to find an optimal value of the vector of unknowns {X} to minimize the total time. Finally, taking a second derivative of that total time with respect to vector of unknowns {X}, wherein a positive-second derivative indicates that the value of the vector of unknowns {X} indeed minimizes and optimizes the total time for performing the dynamic reconfiguration-switching, where vector of unknowns {X} represents one or more unknowns used for subdividing the one hundred percent torque constant and voltage constant of the electric motor into smaller units of a torque constant and a voltage constant (Kt=Kv in SI units) which allows the electric motor to go faster than V angular-velocity and up to an angular-velocity of NV where V is a maximum angular-velocity achieved with the one hundred percent torque constant, and N is an arbitrary value greater than 1, where WC is the a number of possible winding-configurations of the electric motor, and WC=m+2, where m is the number of equations and number of unknowns being solved for.

Figure 24A:
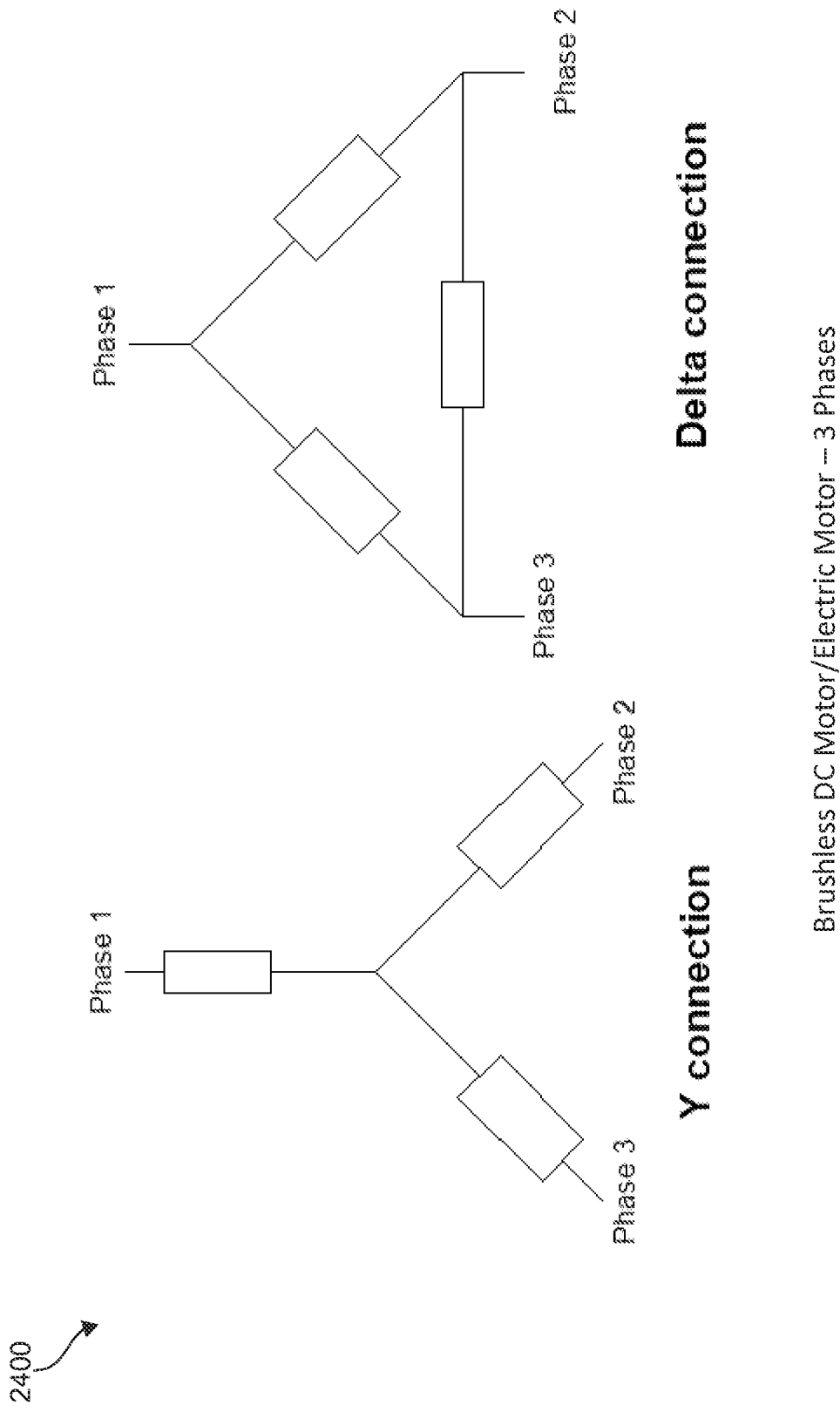
FIG. 24A is a block diagram illustrating a Y-connection and a Delta Connection a brushless DC motor and/or electric motor with 3 phases.
Figure 24C:
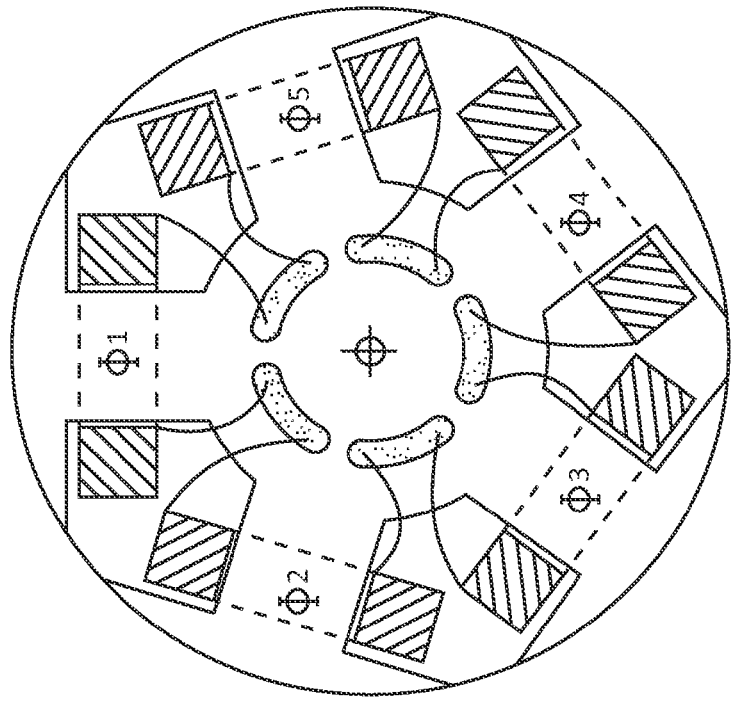
FIG. 24B-C are block diagrams of views through rotors of an electric motor.
Figure 24B:
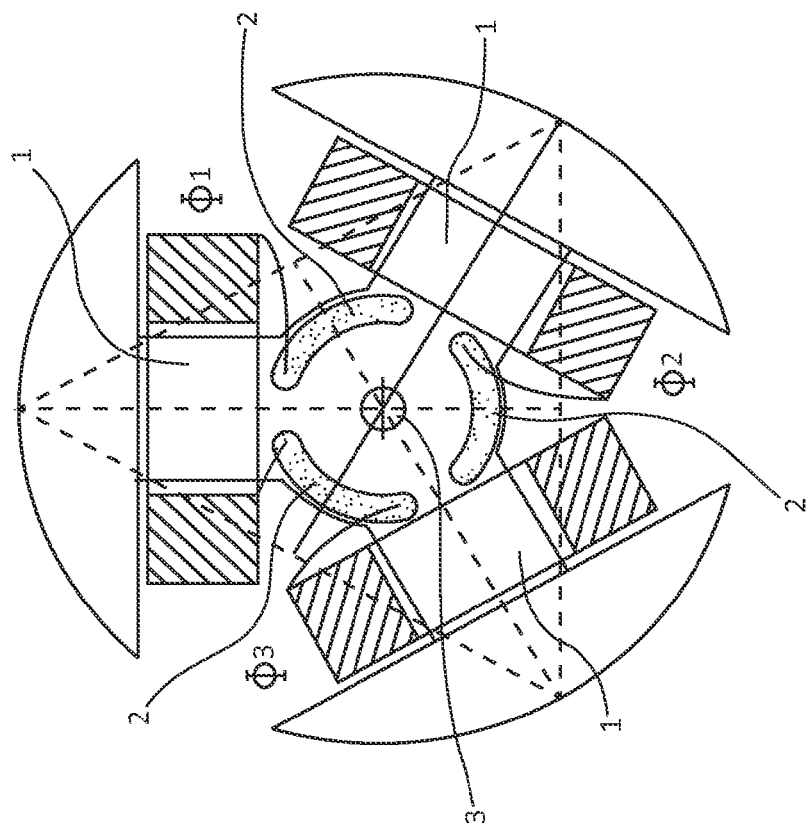

FIG. 24A is a block diagrams 2400 showing wye and delta connection (e.g., Y-connection and a Delta Connection) for a brushless dc motor and/or an electric motor. FIG. 24B-C are block diagrams of views through rotors of an electric motor. As mentioned previously, the optimal dynamic-reconfiguration switching of individual motor winds (e.g., coils) within an electric motor may be performed with either a wye (Y) or a delta connection. FIG. 24A illustrates both the wye and delta connection. For example, in one embodiment, by way of example only, the electric motor may include a stator, including three windings, spaced at 120 degree electrical from one another, for imparting a torque on a rotor. The torque imparted on the rotor causes the rotor to rotate. Those skilled in the art of motors and generators appreciate the efficiency, economy and simplicity of electric motors wherein there is no actual physical contact between the stator windings and the rotor. In order to effectuate the operation of the motor, a properly timed and spaced magnetic field is synthesized in the stator windings, which imparts a torque on the rotor and causes the rotor to rotate. The electric motor may be permanently configured in one of two basic configurations, either a wye connection or a delta connection, as seen in FIG. 24A. The electric motor with windings configured in the delta configuration can operate at a greater speed than the same windings configured in the wye configuration. However, the electric motor with windings configured in the wye configuration can operate with a greater torque at low speeds than the same windings configured in the delta configuration.

Moreover, the illustrated embodiments as described in herein may be applied to a variety of types of electric motors (e.g., an electric motor used in the automotive industry). For example, in one type of electric motor, the electric motor may be comprised of an armature bearing three windings. The armature rotates in a magnetic field and current is generated in the three windings and drawn from them in turn through brushes. Such an electrical motor is shown in FIG. 24B. In one embodiment, a motor armature comprises a rotor having three equiangularly spaced poles 1 about each of which is wound a coil winding Φ. Coil windings Φ are connected to commutator segments 2 which in turn are contacted by brushes (not shown). Such a motor may be used to cause rotation by applying current to the windings, which then rotate within a magnetic field, or may be used in reverse to generate current from rotation of the windings within the magnetic field. For example, a motor with three coil windings Φ1, Φ2 and Φ3 are all identical and have identical numbers of turns in each winding. When the motor rotates, the current that flows through each winding is therefore identical. One way of providing a feedback control signal is to form the three coil windings Φ with a differing numbers of turns. This is shown in FIG. 24B where winding Φ1–1 is formed with a reduced number of turns in comparison with windings Φ2 and Φ3. The effect of this is that as the motor rotates the current that flows through winding Φ1–1 is different from that which flows through windings Φ2 and Φ3. This difference can be detected and used to count the number of rotations of the motor, and also to mark and define the beginning of rotation cycles of the motor. This information can be used in a number of ways to accurately control the rotation of the motor in a number of applications as discussed above. The embodiment as described above has three poles, however it will be understood that this is by no means essential and the motor may have any odd number of poles. For example, as illustrated in FIG. 24C, an electric motor may have a more than three poles (e.g., five poles). The electric motor may be comprised with multiple coil windings. The windings may also have an equal number of turns on one winding. Any one or more of these poles could be provided with a reduced number of turns compared to a regular coil winding. In short, the illustrated embodiments may be applied to a variety of types and variations of electric motors. It should be noted that an electric motor has been described in FIG. 24B-C by way of example only and such rotors/winding, as used in the present invention, are not limited to the electric motor, but other motors commonly used in the art having the various rotors/windings may also be applied to accomplish the spirit and purposes of the present invention.

Figure 25:
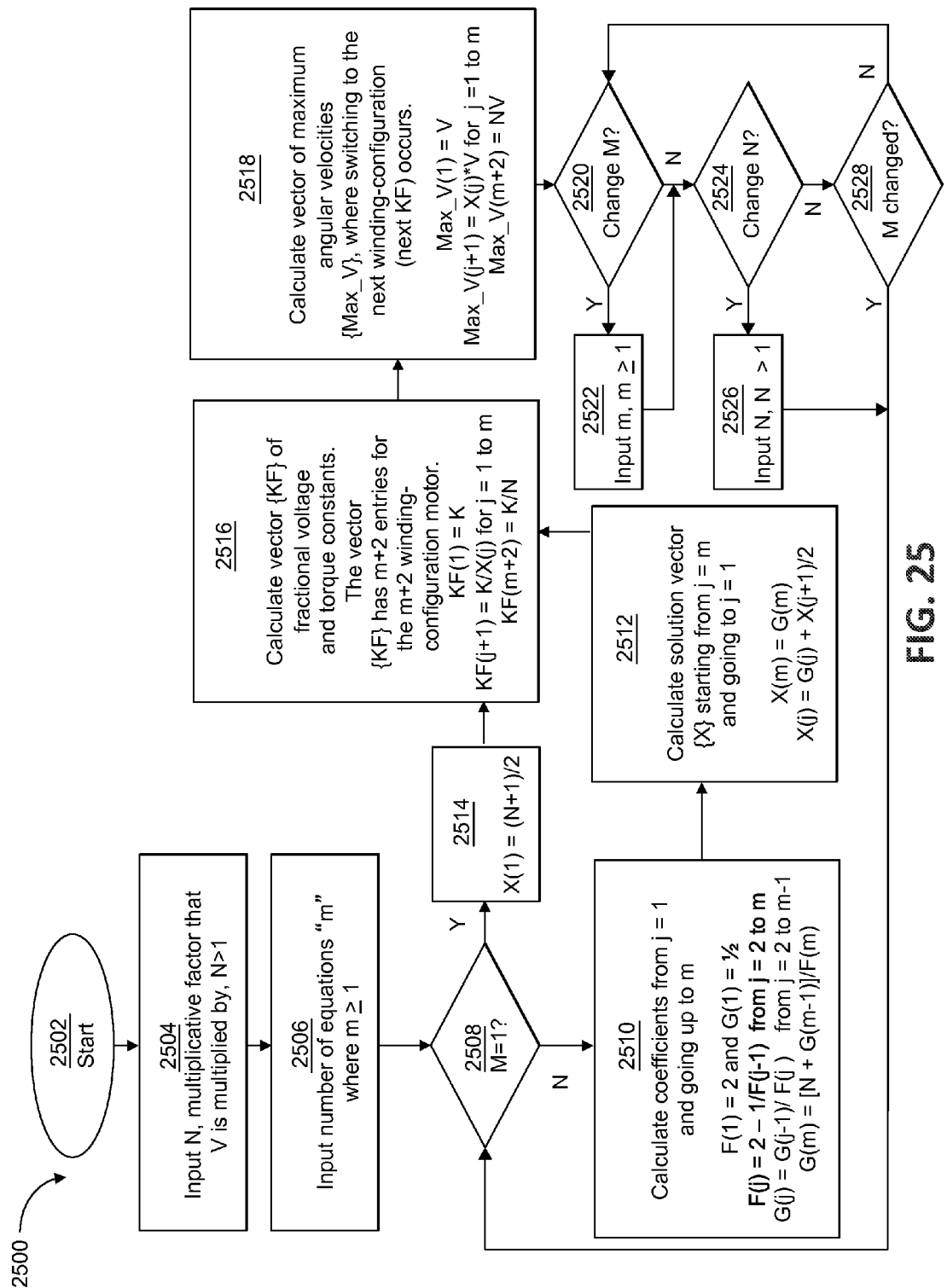
FIG. 25 is a flowchart illustrating an exemplary method of an exemplary optimal switching algorithm.

FIG. 25 is a flowchart illustrating an exemplary method 2500 of an exemplary optimal switching algorithm. The optimizing switching algorithm solutions, as seen above in FIGS. 20, 21, and 23 are summarized in method 2500, where the algorithm is solving for {X}, {KF}, and {Max_V}. The method 2500 begins (step 2502). The method 2500 inputs an initial value for N, the multiplicative factor by which V is multiplied, where N is greater than one "1" (step 2504). The method 2500 inputs an initial value for the number of equations "m," where m is greater than one "1" (step 2506). The method 2500 determines if m is equal to one (step 2508). If no, the method 2500 calculates the coefficients from j equals one "1" (e.g., j=1) up to m (step 2510). As illustrated above in FIG. 22, the calculation of factors $F_j$ and $G_j$ are calculated by the following recursive algorithm:

$$F_1=2 \text{ and } G_1=1/2, \quad (41),$$

$$F_j=2-1/F_{j-1} \text{ from } j=2 \text{ to } m, \quad (42),$$

$$G_j=G_{j-1}/F_j \text{ from } j=2 \text{ to } m-1, \text{ and} \quad (43),$$

$$G_m=(N+G_{m-1})/F_m \quad (44).$$

From step 2510, the method 2500 then calculates the solution vector {X} starting from j=m and going down to j=1, X(m)=G(m) and X(j)=G(j)+X(j+1)/2 (step 2512). Returning to step 2508, if yes the method 2500 the variable X(1) is set equal to (N+1)/2 (step 2514). From both steps 2512, and 2514, the method 2500 calculates the vector {KF} of fractional voltage and torque constants (step 2516). The vector {KF} has m+2 entries for the m+2 winding-configuration motor. KF(1)=K, KF(j+1)=K/X(j) for j=1 to m, and KF(m+2)=K/N. Next, the method 2500 calculates the vector of maximum angular velocities {Max_V}, where switching to the next winding-configuration (next KF) occurs (step 2518), with Max_V(1)=V, Max_V(j+1)=X(j)*V for j=1 to m, and Max_V(m+2)=NV. In one embodiment, the method 2500 ends at step 2518, whereby the method 2500 for dynamic coil switching is configured once for a motor and never changed again.

Figure 26:
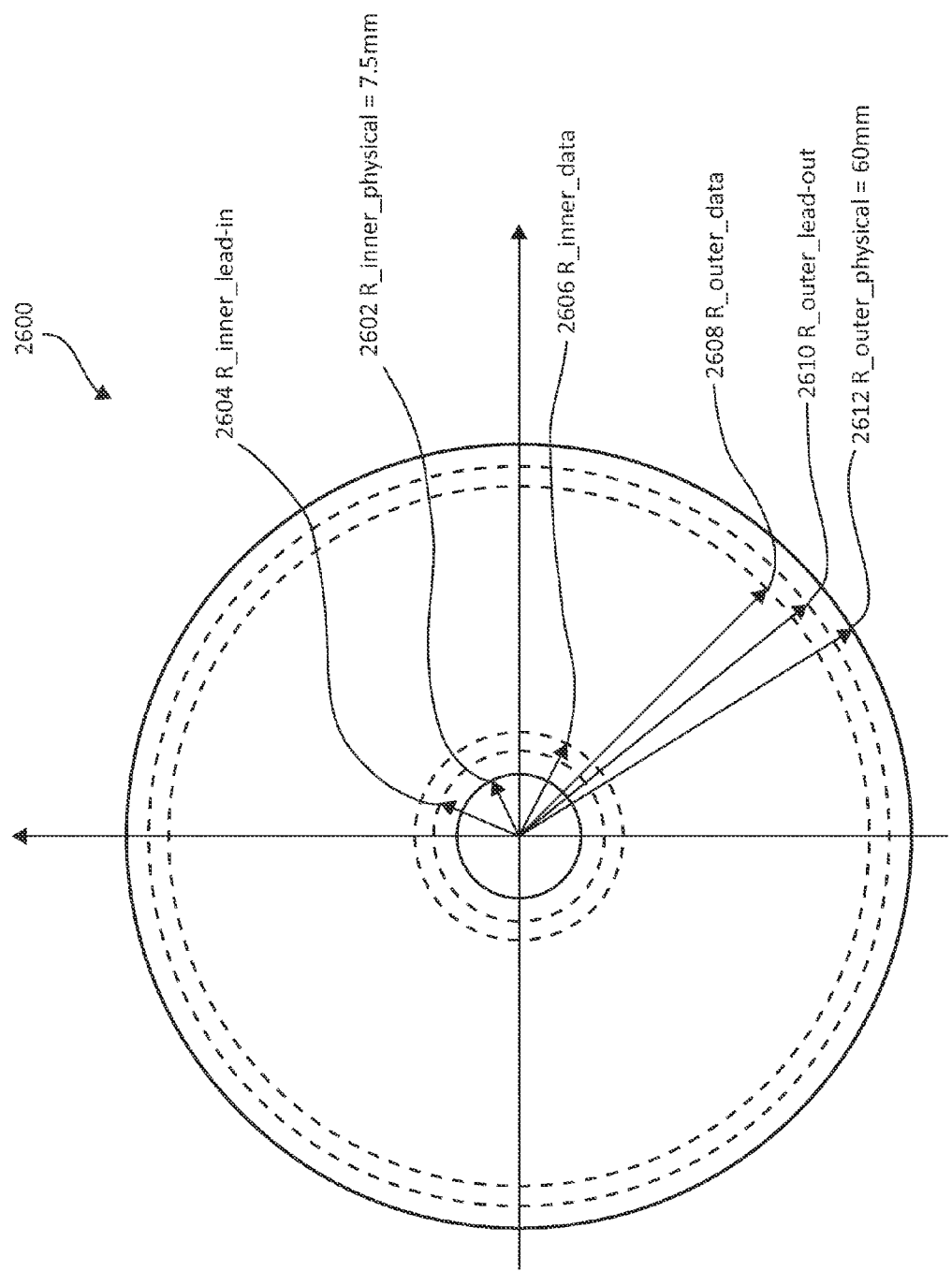
FIG. 26 is a block diagram illustrating a DVD optical disk.

One example of method 2500 could apply to DVD-ROM and Blu-Ray-ROM disk drives, both of which read data from the respective optical disk at a constant linear velocity (CLV). The layout of a DVD-ROM disk 2600 is shown in FIG. 26, where FIG. 26 is a layout diagram of an optical disk 2600, with dimensions coming from ECMA-267, entitled 120 mm DVD-Read-Only Disk. The R_outer_physical of the DVD disk, 2612, equals 60 mm (120 mm diameter disk) and the R_inner_physical of the DVD disk, 2602, equals 7.5 mm (15 mm diameter central hole). Blu-Ray disks have the same physical inner and outer radii, so that DVD disks and Blu-Ray disks may be played on the same drive. DVD disks have a lead in zone beginning at 2604 R_inner_lead-in at 22.6 mm. The data begins at 2606 R_inner_data, at 24 mm. The data continues to 2608 R_outer_data, at 57.5 mm to 58 mm, where the lead-out zone begins. The lead-out zone terminates at 2610 R_outer_lead-out, at approximately 58.5 mm. Method 2500 allows the motor of the disk player to have a torque constant and voltage constant (Kt=Kv in SI units) commensurate to the outermost active radius of the disk, 2610 R_outer_lead-out, and the constant linear velocity (CLV) of the disk. CLV=V*R_outer_lead-out=N*V*R_inner_lead-in. Solving for N for a DVD disk, we get N=R_outer_lead-out/R_inner_lead-in =58.5/22.6=2.6. N may be rounded up to 3 to account for drive, motor, and disk tolerances, giving a practical application of FIG. 8, if m=1 equations are chosen. As the drive reads data from the inner radius outwards, the disk is slowed down and the algorithm shown in FIG. 8 is utilized from bottom to top. Then, if the disk is dual layer, and additional data is read from the outer radius inwards, the algorithm shown in FIG. 8 is utilized from top to bottom.

However, method 2500 permits an additional embodiment, whereby the algorithm for dynamic coil switching is itself dynamically reprogrammable, thus allowing continual change of multiplicative factor N and/or number of equations m. Method 2500 continues to step 2520 where a check is made whether to increase the number of equations m, as that permits higher performance, or to decrease the number of equations m, for lower performance. If the answer is yes in step 2520, method 2500 transfers to step 2522 and the new value of m is obtained, where m is greater than or equal to one (e.g., m≥1), and a flag is set that m has been changed. If the answer is no in step 2520, method 2500 transfers to step 2524, where a check is made whether to increase multiplicative factor N for higher maximum motor speed and simultaneously less motor torque, or to reduce multiplicative factor N for lower maximum motor speed, and simultaneously more motor torque (step 3524). If the answer is yes in step 2524, method 2500 transfers to step 2526 and a new value of m (where m is greater than m, m>1) is obtained and method 2500 proceeds to step 2508 to begin recalculation of the switching algorithm. If the answer is no in step 2524, method 2500 transfers to step 2528 where the flag is checked from step 2520. If the answer is yes in step 2528, method 2500 proceeds to step 2508 to begin recalculation of the switching algorithm. If the answer is no in step 2528, the algorithm loops back to step 2520, searching for changes in m and N.

There are numerous applications for dynamically altering control method 2500 with additional steps 2520-2528. In one embodiment, the constant angular-velocity of disks in a hard disk drive (HDD) is run at a low angular-velocity V to save on power expended during low disk SIOs (Start Input/Output Activities). Running at a low angular-velocity V permits the storage array of hard disk drives to address workload as the storage array is not in a sleep mode but it is clearly in a power-saving mode. As the queue of pending SIOs builds, N is dynamically increased to accommodate the increased workload at the higher angular-velocity of NV. Once the workload becomes quiescent, the value of N is correspondingly reduced.

Another application for dynamically altering control method 2500 involves automobiles, trucks, and motorcycles. Parents may wish to downgrade the performance of the car, if their teenage son or daughter was taking out the car, and V (an angular-velocity) was equivalent to 15 MPH, then the parent or guardian could set N=4, meaning that 4V=60 MPH and the car would be speed limited to 60 MPH (fast enough for any teenage driver). Additionally, the motor could have a limited number of winding-configurations (e.g., switching-states), say m+2=3, meaning that the car would take longer to accelerate to the maximum velocity (the automotive equivalent of a 3-speed transmission) rather than m+2=5 (for example) which would be reserved for the parents (the automotive equivalent of a 5-speed transmission). Thus, the parents have tuned down the performance of the car, given the lack of experience of the driver. The parents would have a password, one allowing the parents to set N=5 (allowing the parents to go 75 MPH) and m+2=5 (faster acceleration). The idea here is not that we merely have a control algorithm for coil switching "on the fly", but that algorithm itself can be reconfigured on the fly (nearly instantaneously), depending upon (a) age of the driver, (b) driving conditions such as weather, and (c) time of day. The car could go to a lower performance mode for night driving (3 N=45 MPH), especially if the weather was bad and road traction was poor due to rain, snow, or ice.

The embodiments are going beyond steps 2502-2518 of method 2500 of simply dynamically reconfiguring the motor coils. Now the present invention is dynamically reconfiguring the algorithm/calculations itself, which is easily done, given the tridiagonal set of equations has an easily programmed solution that avoids the complexity of inverting an m-by-m matrix because the tridiagonal [A] matrix is "sparse" (mostly zeros). Yet another embodiment is that the maximum velocity of a car is determined by N*V*wheel radius. N could be fed to the car via wireless communication such as cell phone telepathy, or Bluetooth communication, or GPS-location, and thus, speeding would be impossible in school zones, construction zones, residential streets, etc. Bluetooth is an advantageous method of communication, given its intentionally short-range distance of communication. Essentially, the car would receive the legal value of N via Bluetooth transmitters in the roadway, or via GPS-location, and the maximum velocity of the car is set that way. N=1 gives 15 MPH for school zones. N=2 or N=3 gives 30 or 45 MPH for residential or business zones. N=4 (60 MPH) or N=5 (75 MPH) gives "expressway" speeds. Bluetooth or GPS-location gives N to the car, and the car resets its algorithm in a fraction of a second, to accommodate the newly allowed speed limit). To allow for varying models of cars, the same Bluetooth network may send out N based on the model of the car, e.g. Honda_N=2, Toyota_N=3, Ford_N=1, F150_N=4, etc.

In yet another automobile, truck, bus, or motorcycle embodiment, if an accident occurs, the Bluetooth network lowers the value of N to speed regulate motorists past the accident scene, to prevent massive chain reaction accidents, especially when visibility is limited.

In a medical embodiment, the DC brushless motor turns an Archimedes screw blood-flow assist of an artificial heart. The DC brushless motor could be held in place by being part of a medical stent used in arteries. As the oxygen content goes down, as measured by a medical oxygen sensor, N is dynamically increased to allow more blood flow through the lungs. Similarly, N could be increased for dental drill applications requiring a higher angular-velocity.

Figure 27:
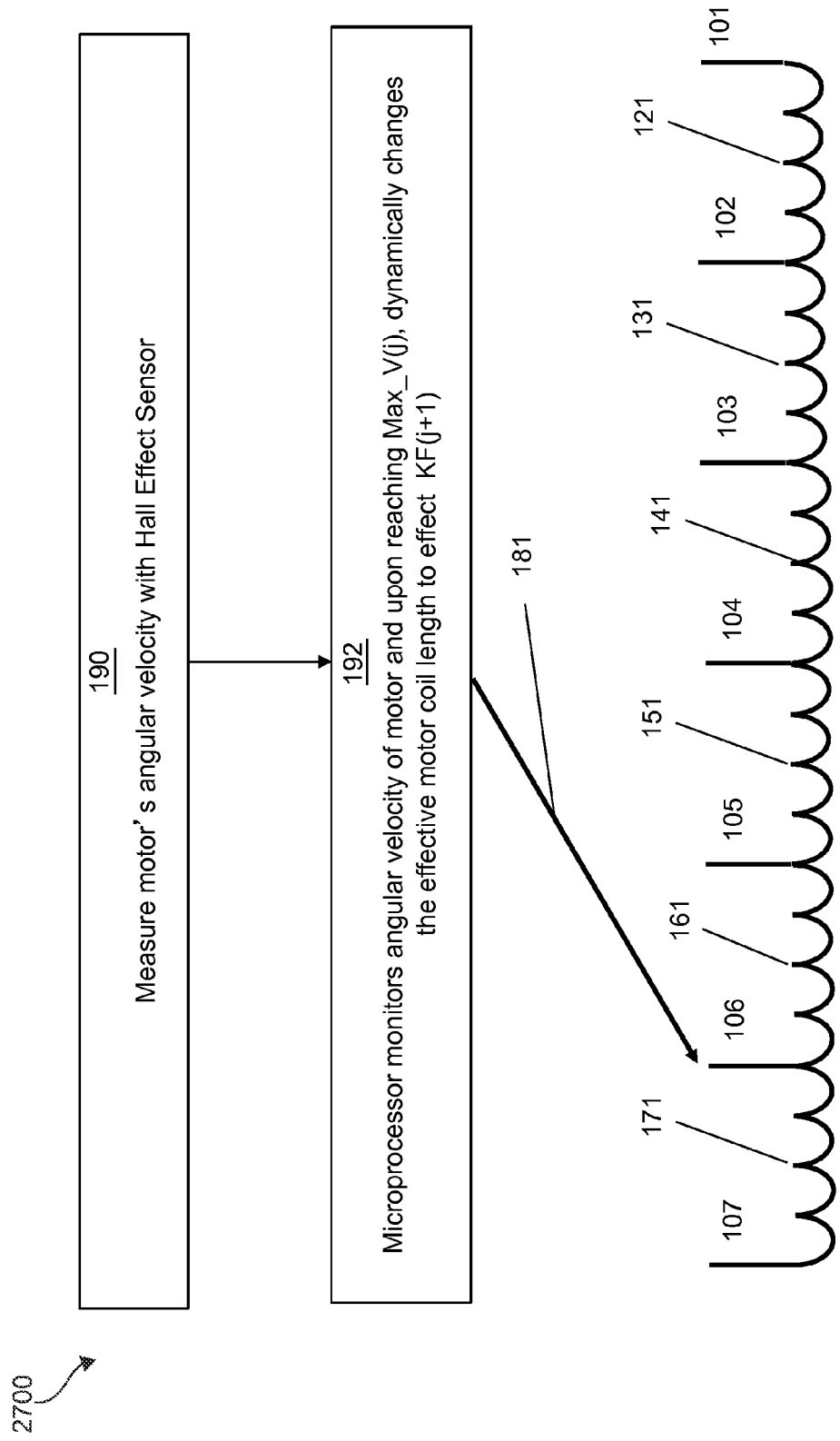
FIG. 27 is a block diagram of a servo system receiving information on updated values of N and m via wireless communication, such as cell phone telepathy, or Bluetooth, or GPS-location.

FIG. 27 is a block diagram 2700 illustrating an exemplary process for monitoring the angular-velocity of the electric motor. Using the Hall Effect Sensor 190, the electric motor's angular-velocity is measured. The microprocessors 192 monitors the angular-velocity of the electric motor, and upon reaching maximum angular velocities Max_V(j) (shown as 171, 161, 151, 141, 121, and 121), the microprocessors dynamically changes the effective motor coil length to effect KF(j+1), with coils 107, 106, 105, 104, 103, 102, and 101.

Figure 28:
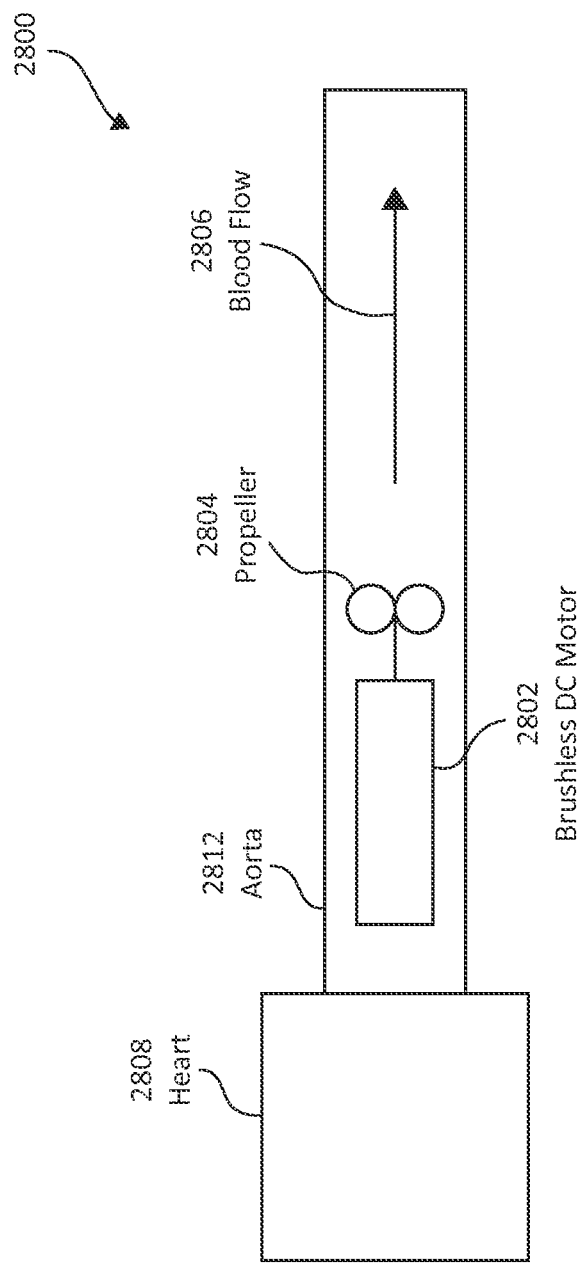
FIG. 28 is a block diagram illustrating an exemplary process for monitoring the angular-velocity of an electric motor.

FIG. 28 is a block diagram illustrating an exemplary motor used in a medical device 2800. Using a brushless DC motor 2802 with the various embodiments described herein to dynamically control the calculation function and the dynamic switching of the motors 2802 windings, the propeller 2804 of the motor 2802 is used to assist the blood flow 2806 in an aorta 2812 from the heart 2808 for a patient. It should be noted that the motor 2802 may be any type of motor, including but not limited to, an electric motor and/or a brushless DC motor. Also, it should be noted that the medical device 2800 may use a variety of motor types, depending upon the particular need of the patient and the specific medical device 2800. The medical device 2800 may use the motor 2802, which employs the various embodiments described herein, in a variety of settings and services to assist the health and welfare of a patient. For example, an electric motor 2802 may be used in a medical device, such as an electric wheel chair powered by the motor 2802 while employing the various methods described herein, such as in FIG. 2500 which controls the calculation function on the fly.

Figure 29:
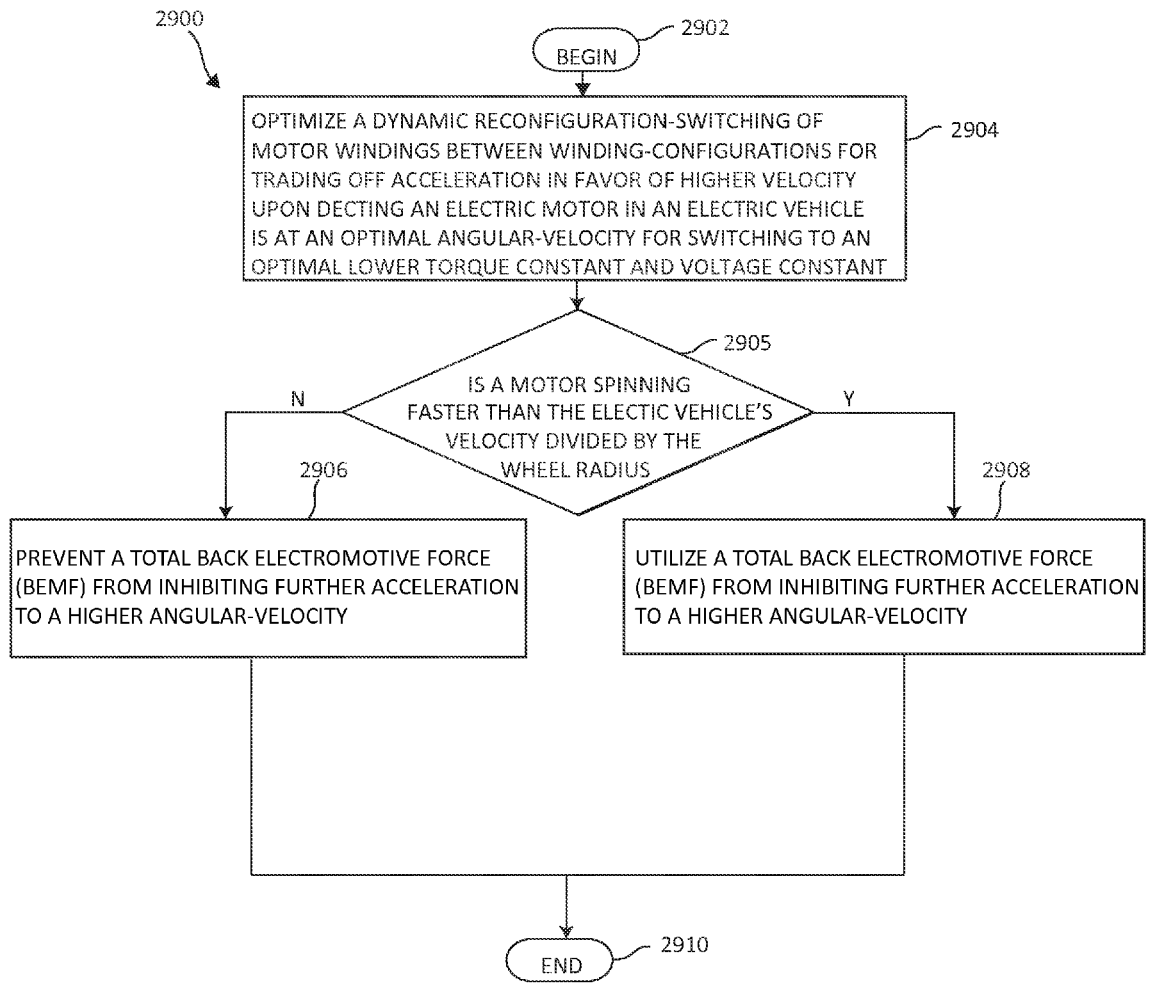
FIG. 29 is a flowchart illustrating an exemplary method of optimizing a dynamic reconfiguration-switching of motor windings in an electric motor in an electric vehicle.

FIG. 29 is a flowchart illustrating an exemplary method 2900 of optimizing a dynamic reconfiguration-switching of motor windings in an electric motor in an electric vehicle. The method 2900 begins (step 2902) by optimizing a dynamic reconfiguration-switching of motor windings between winding-configurations for trading off acceleration in favor of higher velocity upon detecting the electric motor in the electric vehicle is at an optimal angular-velocity for switching to an optimal lower torque constant and voltage constant (step 2904). The method 2900 then determines if one motor of the electric vehicle is spinning faster than the electric vehicle's velocity divided by the wheel radius (step 2905). If no, the total back electromotive force (BEMF) is prohibited from inhibiting further acceleration to a higher angular-velocity (step 2906). If yes, a total back electromotive force (BEMF) is utilized from inhibiting further acceleration to a higher angular-velocity (step 2908). The method 2900 ends (step 2910).

As mentioned above, the embodiments of the present invention may apply to a motor, an electric motor, a brushless DC motor, a tape drive system, an electric motor in an electric vehicle or motorcycle, a wind turbine, and/or a variety of other types of motors. However, each of these various motor types have physical properties and/or hardware configurations that are separate and distinct. For example, an electric car runs with a constant wheel radius so each of the 4 motors in an electric car should run at the same angular velocity (except when making a right or left hand turn). Interestingly enough, if one wheel is spinning at a significantly faster speed than the others, a change in winding configuration, as described above in each of the Fig's, such as engaging additional motor windings, could be performed to compensate for a loss of traction, hydroplaning, and/or skidding, etc. In such a scenario, it would not be desired to facilitate high speed to a wheel losing fraction, which is counterintuitive to what you'd do in a tape drive when one tape motor needs to spin faster than the other.

Moreover, the two motors in a tape drive system almost never run at the same angular velocity. Only at middle-of-tape (MOT) do the two drive motors run at the same angular velocity. At a beginning of tape (BOT), the supply reel includes all of the tape, and hence has a large radius, and thus, rotates more slowly than the take-up reel (with its small radius because it has no tape). Hence, as tape is spun off of the supply reel, the supply reel speeds up, and as tape is added to the takeup reel, the take up reel slows down. A tape drive may have N=3 for a normal data I/O speed. However, N=6 (or some other value) may be used for high speed searching or rewinding. Hence, the tape drive is a good example of where multiple values of N may be used.

In addition, the following illustrates other differences in the physical properties of the motor types for applying the embodiments of the present invention. 1) A hard disk drive or an optical disk drive has 1 (and only 1) drive motor and the drive motor spins the single stack of disks comprising one or more disks. 2) A tape drive has only 2 motors, one for the supply reel and one for the takeup reel. It should be noted that belts and pulleys have been used to allow only one motor, however, a tape drive, having 2 motors, only run at the same angular velocity at the special case of MOT (middle of tape). The supply reel always increases in angular velocity as it sheds tape and the takeup reel always decreases in angular velocity as it gains tape (delta angular velocities of the opposite sign). A high-speed seek may require a higher "N" than normal data I/O. 3) An electric car typically has a minimum of 3 motors (tricycle approach) or 4 motors (typical car), but a motorcycle may have 2 motors. Typically, all motors run at the same angular velocity, except when a turn is made (as the outer wheels in a turn have to spin faster than the inner wheels as they have further to go. An error condition exists (such as hydroplaning, skidding, etc.) when one wheel turns significantly faster than the others, and rather than enabling a higher angular velocity by shedding windings it is possible to add windings to slow down the motor and get more traction, using the embodiments described above in the Fig.'s, but in a torque-control mode rather than a velocity-enabling mode.

Using the above described embodiments, particularly with attention to FIGS. 7-10, additional embodiments of the present invention are provided. As referenced in FIGS. 7-10, an exemplary profile of the optimal switching calculation for optimizing a dynamic reconfiguration-switching between individual motor windings in a 3-winding-configuration motor for trading off angular-acceleration in favor of increased angular-velocity between each successive winding-configuration was depicted. The derivations of this set of states (e.g., the three states) for a motor (e.g., 3-state brushless DC motor, an electric motor, a hard disk drive, a tape drive, etc.) may accelerate to an angular velocity three times that possible with the available voltage supply and the full "K" torque constant and voltage constant of the motor, by successively reducing motor coil torque constant and voltage constant. This reduction of motor coil results in a reduced voltage constant Kv and torque constant Kt (and Kv=Kt=K in SI units), enabling the motor to trade off acceleration for increased velocity. The successive and selective reduction of motor coil torque constant and voltage constant permits a ramp-up time of 6T (6V/A) versus a ramp-up time of 9T (9V/A) for a motor without coil switching (using only a torque constant of K/3).

Turning now to FIG. 30A, a table diagram illustrating an exemplary profile 3000 of the optimal switching calculation for optimizing a dynamic reconfiguration-switching between individual motor windings by selectively lowering resistance of a constantly used portion of a 3-winding-configuration motor for trading off angular-acceleration in favor of increased angular-velocity between each successive winding-configuration is illustrated. In one embodiment, by way of example only, FIG. 30A displays the number of winding configurations "WC," which in this embodiment 3-winding configurations (WC-1, WC-2, and WC-3) are displayed, but the number of winding configurations may be lowered and/or raised accordingly. The required voltage constant and torque constant show a maximal value of K, and then decrease in value to K/2, and finally to K/3 for the three winding-configurations progressing from initial winding-configuration-1 (state 1) where all motor windings are used, winding-configuration-2 (state 2), and winding-configuration-3 (state 3) in successive order. (It should be noted that 0 to T is the first state, T to 3T is the second state, and 3T to 6T is the third state). In one embodiment, by grouping the three states, as used by way of example in FIGS. 7-9, into FIG. 30A it is observed that the K/2 segment (the term "segment" being a portion of the motor windings) is only used in the first state, where "high torque and low angular velocity" exist, and that is only for a duration of time T. Then, the K/6 segment is used during the first and second states, and that being only for duration of 3T (e.g., 0 to T for the first state and T to 3T for that of the second state). However, the K/3 segment of the motor coil winding is used for the entire ramp up time of 6T (e.g., K/3 is a constantly used portion of the motor windings) and is continued to be used for the entire steady-state (streaming) mode after ramp up. It is for this reason that the K/3 segment is clearly the favored segment, and the present invention may select the K/3 segment for a lower resistance, to lower the $I^2*R$ heat factor generated by the motor, where I is the current flowing in a conductor and the R is the resistance of the conductor with I being in amperes and R being in ohms. This lower resistance may be achieved by thicker copper wire, use of square copper wire (more expensive but dramatically reduces flux leakage to produce a much more efficient coil and a square cross-section of side "D" has a lower resistance than a circular cross-section wire of diameter "D") rather than round copper wire, and even a wire of lower resistivity such as silver (FIG. 32, for medical or aerospace applications, where cost is less of an object). To reduce the cost of the motor, the K/2 and K/6 segments need not have this resistance reduction, as those remaining segments are used for only a very small part of the overall duty cycle. It is the K/3 segment, which is always used, and the present invention is to selectively reduce the resistance of that "always-used" segment (e.g., K/3 in this instance having the 3-winding-configuration). The "always-used" segment may also be referred to as a "core" segment. A second embodiment of this invention disclosure is that the K/3 segment is always used when there is power to the 3-state motor, meaning that special switching is only used for the remaining segments, the K/2 and K/6 segments. The K/3 segment is controlled simply by power-on/power-off to the motor. Thus, in one embodiment, the present invention selectively lowers a resistance portion of a coil that is "always used" in a coil-switching motor (e.g., brushless DC motor, an electric motor, a tape drive motor, a hard disk drive (HDD), etc.).

Turning now to FIG. 30B, a table diagram 3050 illustrating an exemplary profile of an optimal winding configuration for a 3-winding-configuration motor spinning up to an angular velocity NV radians per second (N is a variable greater than unity) is illustrated. FIG. 30B is a generalization of FIG. 30A. For example, if a decision is made that N=3 in FIG. 30B, the results would be equal to those illustrated in FIG. 30A. Moreover, FIG. 30B indicates that the present invention is applicable to a general case of spinning a motor (e.g., an electric motor, a brushless DC motor, a tape drive, a hard disk drive, and the like) to a generalized angular velocity of NV, where N is greater than one (e.g., N>1), and there is a "core" segment which is used in all three winding configurations as the motor accelerates up to its full angular velocity of NV radians per second. Thus it is the K/N "core" in the present invention where the extra cost would be spent, such as in square-wire for maximal B field, low resistance conductor such as silver, etc.

As illustrated, the optimal voltage constant and torque constants dynamically decrease from their maximum value of K to 2K/(N+1), and finally down to K/N for the three winding-configurations progressing dynamically from winding-configuration-1, to winding-configuration-2, and finally to winding-configuration-3 in successive order. As illustrated in FIG. 30B in winding-configuration-1 segment 1 uses K/N of the motor coil winding, segment 2 uses the (N−1)K/[N(N+1)] of the motor coil winding, segment 3 uses the (N−1)K/(N+1) of the motor coil winding, and the highest angular velocity is V. For winding-configuration-2, segment 1 uses the K/N of the motor coil winding, segment 2 uses the (N−1)K/[N(N+1)] of the motor coil winding, segment 3 is not used, and the highest angular velocity is (N+1)V/2. For winding-configuration-3, segment 1 uses the K/N of the motor coil winding, segment 2 is not used, segment 3 is not used, and the highest angular velocity is NV.

FIG. 31 is a table diagram illustrating an exemplary profile 3100 of the optimal winding configuration for a 4-winding-configuration (WC) motor spinning up to an angular velocity NV=3V radians per second (N=3). In FIG. 31, by way of example only, the 4-winding-configuration are the number of possible winding-configurations of the motor. The optimal voltage constant and torque constants dynamically decrease from their maximum value of K when all motor windings are engaged, to 3K/5, down to 3K/7, and finally to K/3 for the four winding-configurations progressing dynamically from winding-configuration-1, to winding-configuration-2, to winding-configuration-3, and finally to winding-configuration-4 in successive order. As illustrated in FIG. 31 in winding-configuration-1 segment 1 uses the K/3 segment of the motor coil winding, segment 2 uses 2K/21 of the motor coil winding, segment 3 uses the 6K/35 of the motor coil winding, segment 4 uses the 14K/35 of the motor coil winding, and the highest angular velocity is V from time period 0 to T. For winding-configuration-2, segment 1 uses the K/3 of the motor coil winding, segment 2 uses the 2K/21 of the motor coil winding, segment 3 uses the 6K/35 of the motor coil winding, segment 4 is not used, and the highest angular velocity is 5V/3 from time period T to 19T/9. For winding-configuration-3, segment 1 uses the K/3 of the motor coil winding, segment 2 uses the 2K/21 of the motor coil winding, segment 3 is not used, segment 4 is not used, and the highest angular velocity is 7V/3 from time period 19T/9 to 33T/9. For winding-configuration-4, segment 1 uses the K/3 of the motor coil winding (always used), segment 2 is not used, segment 3 is not used, segment 4 is not used, and the highest angular velocity is 3V from time period 33T/9 to 51T/9.

Thus, as illustrated in FIG. 31, the present invention is applicable to multiple configurations of the various types of motors, namely that there is a "core" segment (in this case K/3) which is constantly used in all four winding configurations as the motor accelerates up to its full angular velocity of 3V radians per second. Thus, it is the K/3 "core" that is the "always used" segment of the motor coil winding in the present invention that selectively lowers a resistance portion. The "always used" segment of the motor coil winding may use a higher quality of winding material, such as in square-wire for maximal B field, low resistance conductor such as silver, etc.

FIG. 32 is a table diagram 3200 illustrating an exemplary resistivity of various types of materials in nano-ohm-meters. As seen, the material "sodium" has a resistivity of 47.7 nano-ohm-meters. The material "lithium" has a resistivity of 92.8 nano-ohm-meters. The material "calcium" has a resistivity of 33.6 nano-ohm-meters. The material "potassium" has a resistivity of 72 nano-ohm-meters. The material "beryllium" has a resistivity of 35.6 nano-ohm-meters. The material "aluminum" has a resistivity of 26.5 nano-ohm-meters. The material "magnesium" has a resistivity of 43.9 nano-ohm-meters. The material "magnesium" has a resistivity of 43.9 nano-ohm-meters. The material "copper" has a resistivity of 16.78 nano-ohm-meters. The material "silver" has a resistivity of 15.87 nano-ohm-meters. The material "gold" has a resistivity of 22.14 nano-ohm-meters. The material "iron" has a resistivity of 96.1 nano-ohm-meters.

The "always used" winding-configuration (e.g., the core segment as illustrated above) could have a significantly lower resistance, by using a larger diameter wire. Based upon the equation that resistance equals resistivity multiplied by the length divided by the area (Resistance=Resistivity*Length/Area), the resistance of the "always used" winding-configuration is based on the resistivity of the conductor multiplied by the length of the conductor, divided by the cross-sectional area of the conductor, as used in the following equation:

$$R = \frac{\rho L}{A}, \quad (45)$$

where R is the resistance, L is the wire length, A is the cross-sectional area, and P is the resistivity. Therefore, for the "always used" winding-configuration, the cross-sectional area could be doubled (for example), to reduce the resistance by a factor of two, and thus reducing the $I^2*R$ heating by a factor of two, which is a significant reduction of "waste heat." This is one such example of how putting more expense (e.g., higher quality of material such as silver) into the "always used" winding-configuration illustrates significant benefits. Additionally, the conductor in the "always used" portion of the winding-configuration could have a square cross-section, to raise the effective winding flux (no flux leakage) thereby reducing the number of windings required in the "always used" winding-configuration and thus reducing the length of the conductor used, and thus further reducing the resistance of the "always used" winding-configuration. Yet, in an alternative embodiment, another way to reduce the resistance of the "always used" winding-configuration is to use a conductor with a lower resistivity than copper, such silver or a superconductor wire. However, given copper's low resistivity (nano-ohms-meters as illustrated in FIG. 32), changing from copper to silver results in a minimal reduction in resistance. Thus, a paradigm shift from copper to a superconductor wire may be used for the "always used" winding-configuration taken from a resistivity standpoint.

In one embodiment, the advantage of using a square cross-section wire versus conventional round-cross-section wire is that the square cross-section wire stacks much more densely, neatly, and consistently, and the improved-stacking configuration increases the efficiency of the generation of magnetic flux (less leakage), which translates into fewer windings of square cross-section wire needed versus circular cross-section wire. Fewer windings of square cross section wire results in a lower resistance, per equation (45), which lowers the resistance of the "always used" winding-configuration.

Figure 33:
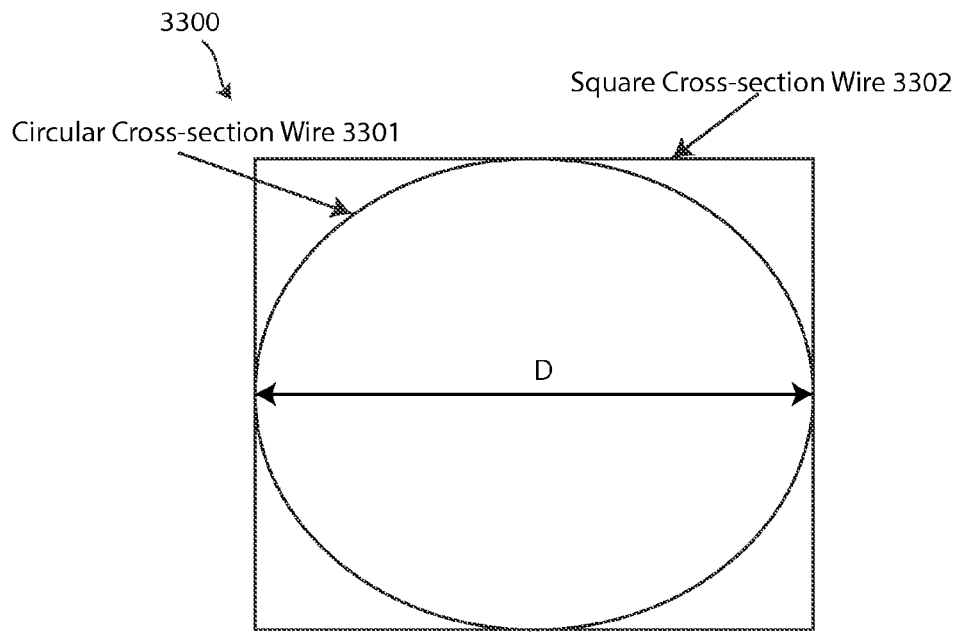
FIG. 33 is a diagram illustrating an exemplary commonly used motor coil cross-section wire and a more expensive square cross-section both with a common dimension "D"

FIG. 33 is a diagram 3300 illustrating an exemplary commonly used motor coil cross-section wire and a more expensive square cross-section both with a common dimension "D." FIG. 33 illustrates commonly used circular cross-section wire 3301 and the more expensive square cross-section wire 3202, both with a common dimension "D." The cross-sectional area of circular cross-section wire 3301 is $$\pi * \frac{D^2}{4}.$$

However, the cross-sectional area of square cross-section wire 3202 is $D^2$, which is $4/\pi$ or 1.2715 (27.15%) larger in cross-sectional area than the circular cross-section wire 3301, for the same common dimension "D." As illustrated above in FIG. 32, equation (45) (e.g., $$R = \frac{\rho L}{A})$$

indicates that for FIG. 33, the resistance of the square cross-section wire 3202 will be $\pi/4$ or 0.7854 (78.54%) of the circular cross-section wire 3301. Thus, use of the more expensive square cross-section wire 3202 for the "always used" winding "K/N" results in significantly lower $I^2*R$ heating during steady-state usage. The circular cross-section wire 3301 produces more $I^2*R$ heating during acceleration, but the motor quickly accelerates through the temporarily used windings (e.g. the remaining portions of the motor windings that are not the "always used" portion of the motor windings), and thus the expense of square cross-section wire 3202 can be reserved for the final K/N "steady state" winding configuration, which is central to the present invention.

Figure 34:
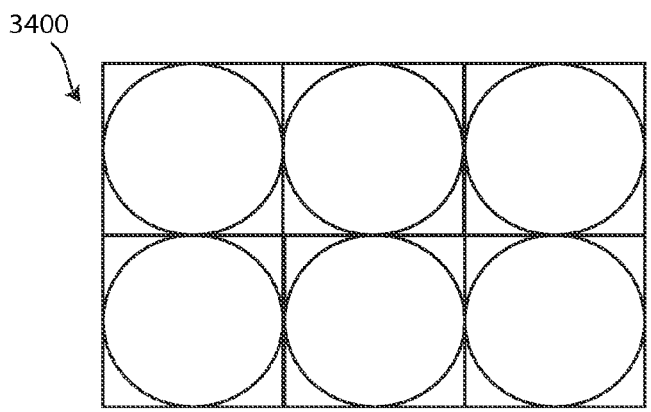
FIG. 34 is a diagram illustrating an additional exemplary motor coil cross-section wire having additional instances with more expensive square cross-section both with a common dimension of FIG. 33.
Figure 35:
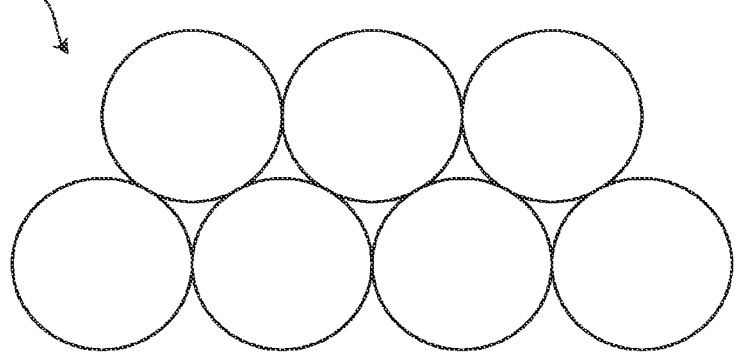
FIG. 35 is a diagram illustrating an exemplary motor coil cross-section wire wrapped in a close-packed arrangement.

FIG. 34 is a diagram 3400 illustrating an additional exemplary motor coil cross-section wire having additional instances with more expensive square cross-section both with a common dimension of FIG. 33. FIG. 34 illustrates FIG. 33 will numerous instances of the motor coil wires. Similarly, as mentioned above in FIG. 33, the equation (45) (e.g., R=pL/A) indicates that for FIG. 33, the resistance of the square cross-section wire 3202 will be $\pi/4$ or 0.7854 (78.54%) of the circular cross-section wire 3301. The comparison for this packing strategy for circular versus square cross-section wire indicates a 21.46% power savings (1-78.54%). However, as illustrated in FIG. 35, motor coil cross-section wires 3500 may be wrapped in a close-packed arrangement. Having the close-packed arrangement, as illustrated in FIG. 35, the volume fraction is PI divided by (2 times the square root of 3)=0.9069 (e.g., 90.69%), which leads to a significant 10% power savings, providing that the missing end area of alternate layers can be neglected because there are many windings. If the missing end area needs to be included, the calculation of power savings will increase from the 9.39% (1−0.9069) predicted by FIG. 34 and move upwards towards the 21.46% (1−0.7854) predicted by FIG. 33 if the coil in FIG. 34 is narrow and has few windings from left to right, and the missing area needs to be accounted for in the analysis.

Thus, as described above, the dynamic reconfiguration-switching of motor windings in a motor is optimized between winding-configurations by selectively lowering resistance of a constantly used portion of one of the motor windings. Acceleration is traded off in favor of higher velocity upon detecting the electric motor in the electric vehicle is at an optimal angular-velocity for switching to an optimal lower torque constant and voltage constant. The total back electromotive force (BEMF) is prohibited from inhibiting further acceleration to a higher angular-velocity. A constantly used portion of one of the motor windings is used for each of the WCth-winding-configuration while accelerating up to the angular-velocity of NV, where V is a maximum angular-velocity achieved with the one hundred percent torque constant, and N is an arbitrary value greater than 1, where WC is a number of possible winding-configurations of the motor. The constantly used portion (e.g., the always uses portion) of one of the motor windings is used while power is supplied to the motor. The dynamic reconfiguration-switching of the motor windings between winding-configurations is applied to only those remaining portions of the motor windings for trading off acceleration in favor of higher velocity upon detecting the motor is at the optimal angular-velocity for switching to an optimal lower torque constant and voltage constant.

In one embodiment, a square-cross-section wire may be used for the constantly used portion of one of the motor windings. The higher cross-sectional area of the square-cross-section wire of side "D" has a lower electrical resistance thereby consuming less power than traditional circular-cross-sectional wire of diameter "D."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions which execute via the processor of the computer or other programmable data processing apparatus, create means for implementing the functions/acts specified in the flowchart and/or block diagram block or blocks.

These computer program instructions may also be stored in a computer readable medium that can direct a computer, programmable data processing apparatus, or other device to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or device to cause a series of operational steps to be performed on the computer, other programmable apparatus or device, to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for switching motor windings within a motor using a processor device, the method comprising:
   optimizing a dynamic reconfiguration-switching of a plurality of motor windings between a plurality of winding-configurations by selectively lowering resistance of a constantly used portion of one of the plurality of motor windings for trading off acceleration in favor of higher velocity upon detecting the motor is at an optimal angular-velocity for switching to an optimal lower torque constant and voltage constant thereby preventing a total back electromotive force (BE MF) from inhibiting further acceleration to a higher angular-velocity; and
   using m simultaneous-linear equations, having m number of unknown variables, for determining a plurality of voltage constants, the optimal time, and the optimal angular-velocity for performing the dynamic reconfiguration-switching between each of the plurality of winding-configurations, wherein a number of the m simultaneous-linear equations increases, starting with one equation for a three-winding- configuration of the motor and adding an additional simultaneous equation for each additional one of the plurality of winding-configurations, and a number of the plurality of voltage constants equal to the correlating one of the plurality of winding-configurations.

2. The method of claim 1, further including performing the dynamic reconfiguration-switching between the plurality of motor windings using one of a wye connection and a delta connection system for the motor.

3. The method of claim 1, further including performing the dynamic reconfiguration-switching between the plurality of winding-configurations in a successive order when a velocity sensor detects the motor is at the optimal angular-velocity for switching the torque constant and the voltage constant.

4. The method of claim 1, further including trading off angular-acceleration for a greater angular-velocity as speed of the motor is increased whereby the torque constant, the voltage constant, and the angular-acceleration correspondingly decrease.

5. The method of claim 1, further including performing the dynamic reconfiguration-switching using a higher angular-acceleration at a lower angular-velocity upon slowing down the motor.

6. The method of claim 1 further including organizing the m simultaneous-linear equations, having the m number of unknown variables, into a tridiagonal system of linear equations, a coefficient matrix of the tridiagonal system of linear equations having 2's along an entire main diagonal of the coefficient matrix, and negative 1's along diagonals immediately adjacent to the main diagonal, and all other entries of the coefficient matrix being zero, and a right-hand-side vector comprising a first entry of 1, a last entry of N, denoting N times a maximum allowable angular-velocity V of the motor at a one hundred percent torque constant, and all other entries of the right-hand-side vector being zero.

7. The method of claim 6, further including, for a WCth-winding-configuration of the motor, performs each of:
   increasing to an angular-velocity N times a capability of the motor with the one hundred percent torque constant and the voltage constant,
   calculating an optional time for performing the dynamic reconfiguration-switching by first finding a total time for acceleration to an angular-velocity of NV and differentiating the total time with respect to vector of unknowns X and then setting each first derivatives to zero to find an optimal value of the vector of unknowns X to minimize the total time, and
   taking a second derivative of the total time with respect to the vector of unknowns X, wherein a positive-second derivative indicates a value of the vector of unknowns X that minimizes and optimizes the total time for performing the dynamic reconfiguration-switching, where X is an unknown used for subdividing the one hundred percent torque constant of the motor into smaller units of the torque constant which allows the motor to go faster than V angular-velocity and up to the angular-velocity of NV where V is a maximum angular-velocity achieved with the one hundred percent torque constant, and N is an arbitrary value greater than 1, where WC is the a number of possible winding-configurations of the motor.

8. The method of claim 7, further including using the constantly used portion of one of the plurality of motor windings for the WCth-winding-configuration while accelerating up to the angular-velocity of NV, where V is a maximum angular-velocity achieved with the one hundred percent torque constant, and N is an arbitrary value greater than 1, where WC is a number of possible winding-configurations of the motor.

9. The method of claim 1, further including increasing a total angular velocity and decreasing the torque constant, the voltage constant, and angular-acceleration as a number of the plurality of motor windings of the motor increases.

10. The method of claim 1, further including activating a plurality of switches to connect the plurality of motor windings in a parallel configuration to reduce the total back-EMF from the plurality of motor windings and allow for greater angular-velocity of the motor.

11. The method of claim 1, further including activating a plurality of switches to bypass an electrical connection to at least one of the plurality of motor windings to provide a minimum back-EMF and allow for greater angular-velocity of the motor.

12. The method of claim 1, further including activating a plurality of switches to connect the plurality of motor windings in a serial configuration to maximize torque on the motor.

13. The method of claim 1, further including selectively activating the plurality of motor windings for each electrical phase of the motor to provide for multiple velocities.

14. The method of claim 1, further including activating a plurality of switches to disconnect the plurality of motor windings in a serial configuration to maximize torque on the motor.

15. The method of claim 1, wherein the dynamic reconfiguration-switching occurs between each of the plurality of winding-configurations at an optimal time for allowing a dynamic trade-off between the angular-velocity and angular-acceleration.

16. The method of claim 1, wherein the motor is at least one of an electric motor, a tape drive motor, and a brushless DC motor.

17. The method of claim 1, further including using the constantly used portion of one of the plurality of motor windings for each of a plurality of winding-configurations while accelerating up to the optimal angular-velocity.

18. The method of claim 1, further including using the constantly used portion of one of the plurality of motor windings while power is supplied to the motor.

19. The method of claim 18, further including applying the dynamic reconfiguration-switching of a plurality of motor windings between a plurality of winding-configurations to only those remaining portions of the plurality of motor windings for trading off acceleration in favor of higher velocity upon detecting the motor is at the optimal angular-velocity for switching to an optimal lower torque constant and voltage constant.

20. The method of claim 1, further including using square-cross-section wire for the constantly used portion of one of the plurality of motor windings, wherein the higher cross-sectional area of the square-cross-section wire of side "D" has a lower electrical resistance thereby consuming less power than traditional circular-cross-sectional wire of diameter "D".

21. The method of claim 20, further including using a material for the square-cross-section wire having a resistivity equal to or less than copper.

22. A system for switching motor windings within a motor, the system comprising:
a motor having a plurality of motor windings,
a plurality of switches for controlling a current through the plurality of motor windings of the motor, and
a processor device in communication with the plurality of switches, wherein the processor device:
optimizes a dynamic reconfiguration-switching of a plurality of motor windings between a plurality of winding-configurations by selectively lowering resistance of a constantly used portion of one of the plurality of motor windings for trading off acceleration in favor of higher velocity upon detecting the motor is at an optimal angular-velocity for switching to an optimal lower torque constant and voltage constant thereby preventing a total back electromotive force (BEMF) from inhibiting further acceleration to a higher angular-velocity, and
uses m simultaneous-linear equations, having m number of unknown variables, for determining a plurality of voltage constants, the optimal time, and the optimal angular-velocity for performing the dynamic reconfiguration-switching between each of the plurality of winding-configurations, wherein a number of the m simultaneous-linear equations increases, starting with one equation for a three-winding-configuration of the motor and adding an additional simultaneous equation for each additional one of the plurality of winding-configurations, and a number of the plurality of voltage constants equal to the correlating one of the plurality of winding-configurations.

23. The system of claim 22, wherein the processor device performs the dynamic reconfiguration-switching between the plurality of motor windings using one of a wye connection and a delta connection system for the motor.

24. The system of claim 22, wherein the processor device performs the dynamic reconfiguration-switching between the plurality of winding-configurations in a successive order when a velocity sensor detects the motor is at the optimal angular-velocity for switching the torque constant and the voltage constant.

25. The system of claim 22, wherein the processor device trades off angular-acceleration for a greater angular-velocity as speed of the motor is increased whereby the torque constant, the voltage constant, and the angular-acceleration correspondingly decrease.

26. The system of claim 22, wherein the processor device performs the dynamic reconfiguration-switching using a higher angular-acceleration at a lower angular-velocity upon slowing down the motor.

27. The system of claim 22, wherein the processor device organizes the m simultaneous-linear equations, having the m number of unknown variables, into a tridiagonal system of linear equations, a coefficient matrix of the tridiagonal system of linear equations having 2's along an entire main diagonal of the coefficient matrix, and negative 1's along diagonals immediately adjacent to the main diagonal, and all other entries of the coefficient matrix being zero, and a right-hand-side vector comprising a first entry of 1, a last entry of N, denoting N times a maximum allowable angular-velocity V of the motor at a one hundred percent torque constant, and all other entries of the right-hand-side vector being zero.

28. The system of claim 27, wherein the processor device, for a WCth-winding-configuration of the motor, performs each of:
increasing to an angular-velocity N times a capability of the motor with the one hundred percent torque constant and the voltage constant,
calculating an optional time for performing the dynamic reconfiguration-switching by first finding a total time for acceleration to an angular-velocity of NV and differentiating the total time with respect to vector of unknowns X and then setting each first derivatives to zero to find an optimal value of the vector of unknowns X to minimize the total time, and
taking a second derivative of the total time with respect to the vector of unknowns X, wherein a positive-second derivative indicates a value of the vector of unknowns X that minimizes and optimizes the total time for performing the dynamic reconfiguration-switching, where X is an unknown used for subdividing the one hundred percent torque constant of the motor into smaller units of the torque constant which allows the motor to go faster than V angular-velocity and up to the angular-velocity of NV where V is a maximum angular-velocity achieved with the one hundred percent torque constant, and N is an arbitrary value greater than 1, where WC is the a number of possible winding-configurations of the motor.

29. The system of claim 28, wherein the processor device uses the constantly used portion of one of the plurality of motor windings for the WCth-winding-configuration while accelerating up to the angular-velocity of NV, where V is a maximum angular-velocity achieved with the one hundred percent torque constant, and N is an arbitrary value greater than 1, where WC is a number of possible winding-configurations of the motor.

30. The system of claim 28, wherein the processor device increases a total angular velocity and decreasing the torque constant, the voltage constant, and angular-acceleration as a number of the plurality of motor windings of the motor increases.

31. The system of claim 30, wherein the processor device activates the plurality of switches to connect the plurality of motor windings in a parallel configuration to reduce the total back-EMF from the plurality of motor windings and allow for greater angular-velocity of the motor.

32. The system of claim 22, wherein the processor device activates the plurality of switches to bypass an electrical connection to at least one of the plurality of motor windings to provide a minimum back-EMF and allow for greater angular-velocity of the motor.

33. The system of claim 22, wherein the processor device activates the plurality of switches to connect the plurality of motor windings in a serial configuration to maximize torque on the motor.

34. The system of claim 22, wherein the processor device selectively activates the plurality of motor windings for each electrical phase of the motor to provide for multiple velocities.

35. The system of claim 22, wherein the processor device activates the plurality of switches to disconnect the plurality of motor windings in a serial configuration to maximize torque on the motor.

36. The system of claim 22, wherein the dynamic reconfiguration-switching occurs between each of the plurality of winding-configurations at an optimal time for allowing a dynamic trade-off between the angular-velocity and angular-acceleration.

37. The system of claim 22, wherein the motor is at least one of an electric motor, a tape drive motor, and a brushless DC motor.

38. The system of claim 22, wherein the processor device uses the constantly used portion of one of the plurality of motor windings for each of a plurality of winding-configurations while accelerating up to the optimal angular-velocity.

39. The system of claim 22, wherein the processor device uses the constantly used portion of one of the plurality of motor windings while power is supplied to the motor.

40. The system of claim 39, wherein the processor device applies the dynamic reconfiguration-switching of a plurality of motor windings between a plurality of winding-configurations to only those remaining portions of the plurality of motor windings for trading off acceleration in favor of higher velocity upon detecting the motor is at the optimal angular-velocity for switching to an optimal lower torque constant and voltage constant.

41. The system of claim 22, wherein the processor device uses square-cross-section wire for the constantly used portion of one of the plurality of motor windings, wherein the higher cross-sectional area of the square-cross-section wire of side "D" has a lower electrical resistance thereby consuming less power than traditional circular-cross-sectional wire of diameter "D".

42. The system of claim 41, wherein the processor device uses a material for the square-cross-section wire having a resistivity equal to or less than copper.

43. A computer program product for switching motor windings within a motor using a processor device, the computer program product comprising a non-transitory computer-readable storage medium having computer-readable program code portions stored therein, the computer-readable program code portions comprising:
 a first executable portion that optimizes a dynamic reconfiguration-switching of a plurality of motor windings between a plurality of winding-configurations by selectively lowering resistance of a constantly used portion of one of the plurality of motor windings for trading off acceleration in favor of higher velocity upon detecting the motor is at an optimal angular-velocity for switching to an optimal lower torque constant and voltage constant thereby preventing a total back electromotive force (BEMF) from inhibiting further acceleration to a higher angular-velocity; and
 a second executable portion that uses m simultaneous-linear equations, having m number of unknown variables, for determining a plurality of voltage constants, the optimal time, and the optimal angular-velocity for performing the dynamic reconfiguration-switching between each of the plurality of winding-configurations, wherein a number of the m simultaneous-linear equations increases, starting with one equation for a three-winding-configuration of the motor and adding an additional simultaneous equation for each additional one of the plurality of winding-configurations, and a number of the plurality of voltage constants equal to the correlating one of the plurality of winding-configurations.

44. The computer program product of claim 43, further including a second executable portion that performs the dynamic reconfiguration-switching between the plurality of motor windings using one of a wye connection and a delta connection system for the motor.

45. The computer program product of claim 43, further including a second executable portion that performs the dynamic reconfiguration-switching between the plurality of winding-configurations in a successive order when a velocity sensor detects the motor is at the optimal angular-velocity for switching the torque constant and the voltage constant.

46. The computer program product of claim 43, further including a second executable portion that trades off angular-acceleration for a greater angular-velocity as speed of the motor is increased whereby the torque constant, the voltage constant, and the angular-acceleration correspondingly decrease.

47. The computer program product of claim 43, further including a second executable portion that performs the dynamic reconfiguration-switching using a higher angular-acceleration at a lower angular-velocity upon slowing down the motor.

48. The computer program product of claim 43, further including a third executable portion that organizes the m simultaneous-linear equations, having the m number of unknown variables, into a tridiagonal system of linear equations, a coefficient matrix of the tridiagonal system of linear equations having 2's along an entire main diagonal of the coefficient matrix, and negative 1's along diagonals immediately adjacent to the main diagonal, and all other entries of the coefficient matrix being zero, and a right-hand-side vector comprising a first entry of 1, a last entry of N, denoting N times a maximum allowable angular-velocity V of the motor at a one hundred percent torque constant, and all other entries of the right-hand-side vector being zero.

49. The computer program product of claim 48, further including a fourth executable portion that, for a WCth-winding-configuration of the motor, performs each of:
increasing to an angular-velocity N times a capability of the motor with the one hundred percent torque constant and the voltage constant,
calculating an optional time for performing the dynamic reconfiguration-switching by first finding a total time for acceleration to an angular-velocity of NV and differentiating the total time with respect to vector of unknowns X and then setting each first derivatives to zero to find an optimal value of the vector of unknowns X to minimize the total time, and
taking a second derivative of the total time with respect to the vector of unknowns X, wherein a positive-second derivative indicates a value of the vector of unknowns X that minimizes and optimizes the total time for performing the dynamic reconfiguration-switching, where X is an unknown used for subdividing the one hundred percent torque constant of the motor into smaller units of the torque constant which allows the motor to go faster than V angular-velocity and up to the angular-velocity of NV where V is a maximum angular-velocity achieved with the one hundred percent torque constant, and N is an arbitrary value greater than 1, where WC is the a number of possible winding-configurations of the motor.

50. The computer program product of claim 49, further including a fifth executable portion that increases a total angular velocity and decreasing the torque constant, the voltage constant, and angular-acceleration as a number of the plurality of motor windings of the motor increases.

51. The computer program product of claim 50, further including a sixth executable portion that activates the plurality of switches to connect the plurality of motor windings in a parallel configuration to reduce the total back-EMF from the plurality of motor windings and allow for greater angular-velocity of the motor.

52. The computer program product of claim 49, further including a fifth executable portion that uses the constantly used portion of one of the plurality of motor windings for a WCth-winding-configuration while accelerating up to the angular-velocity of NV, where V is a maximum angular-velocity achieved with the one hundred percent torque constant, and N is an arbitrary value greater than 1, where WC is a number of possible winding-configurations of the motor.

53. The computer program product of claim 43, further including a second executable portion that activates the plurality of switches to bypass an electrical connection to at least one of the plurality of motor windings to provide a minimum back-EMF and allow for greater angular-velocity of the motor.

54. The computer program product of claim 43, further including a second executable portion that activates the plurality of switches to connect the plurality of motor windings in a serial configuration to maximize torque on the motor.

55. The computer program product of claim 43, further including a second executable portion that selectively activates the plurality of motor windings for each electrical phase of the motor to provide for multiple velocities.

56. The computer program product of claim 43, further including a second executable portion that activates the plurality of switches to disconnect the plurality of motor windings in a serial configuration to maximize torque on the motor.

57. The computer program product of claim 43, wherein the dynamic reconfiguration-switching occurs between each of the plurality of winding-configurations at an optimal time for allowing a dynamic trade-off between the angular-velocity and angular-acceleration.

58. The computer program product of claim 43, wherein the motor is at least one of an electric motor, a tape drive motor, and a brushless DC motor.

59. The computer program product of claim 43, further including a second executable portion that uses the constantly used portion of one of the plurality of motor windings for each of a plurality of winding-configurations while accelerating up to the optimal angular-velocity.

60. The computer program product of claim 43, further including a second executable portion that uses the constantly used portion of one of the plurality of motor windings while power is supplied to the motor.

61. The computer program product of claim 60, further including a third executable portion that applies the dynamic reconfiguration-switching of a plurality of motor windings between a plurality of winding-configurations to only those remaining portions of the plurality of motor windings for trading off acceleration in favor of higher velocity upon detecting the motor is at the optimal angular-velocity for switching to an optimal lower torque constant and voltage constant.

62. The computer program product of claim 43, further including a second executable portion that uses square-cross-section wire for the constantly used portion of one of the plurality of motor windings, wherein the higher cross-sectional area of the square-cross-section wire of side "D" has a lower electrical resistance thereby consuming less power than traditional circular-cross-sectional wire of diameter "D".

63. The computer program product of claim 62, further including a third executable portion that uses a material for the square-cross-section wire having a resistivity equal to or less than copper.

* * * * *